United States Patent
Pasko et al.

(10) Patent No.: US 12,437,204 B1
(45) Date of Patent: Oct. 7, 2025

(54) SCHEDULING NEURAL INFERENCE TASKS

(71) Applicant: Amazon Technologies, Inc., Seattle, WA (US)

(72) Inventors: Stanislaw Ignacy Pasko, Zawonia (PL); Alexander Ivchenko, Gdansk (PL)

(73) Assignee: Amazon Technologies, Inc., Seattle, WA (US)

( * ) Notice: Subject to any disclaimer, the term of this patent is extended or adjusted under 35 U.S.C. 154(b) by 1078 days.

(21) Appl. No.: 17/362,361

(22) Filed: Jun. 29, 2021

(51) Int. Cl.
| | |
|---|---|
| *G10L 15/16* | (2006.01) |
| *G06F 9/48* | (2006.01) |
| *G06N 3/044* | (2023.01) |
| *G06N 3/045* | (2023.01) |
| *G06N 3/088* | (2023.01) |
| *G10L 15/22* | (2006.01) |

(52) U.S. Cl.
CPC .......... *G06N 3/088* (2013.01); *G06F 9/4818* (2013.01); *G06N 3/044* (2023.01); *G06N 3/045* (2023.01); *G10L 15/16* (2013.01); *G06F 2209/484* (2013.01); *G10L 15/22* (2013.01); *G10L 2015/223* (2013.01)

(58) Field of Classification Search
CPC ........ G10L 15/16; G10L 15/22; G06F 9/5038
See application file for complete search history.

(56) References Cited

U.S. PATENT DOCUMENTS

| | | | | |
|---|---|---|---|---|
| 2016/0140956 A1* | 5/2016 | Yu | ............................ | G10L 15/08 704/240 |
| 2019/0311715 A1* | 10/2019 | Pfeffinger | ................ | G10L 17/22 |
| 2021/0050020 A1* | 2/2021 | Li | ............................ | G10L 17/02 |

FOREIGN PATENT DOCUMENTS

EP 3799390 B1 * 9/2024 ........... G06F 9/5038

* cited by examiner

*Primary Examiner* — Feng-Tzer Tzeng
(74) *Attorney, Agent, or Firm* — Pierce Atwood LLP

(57) ABSTRACT

Some speech processing systems may handle some commands on-device rather than sending the audio data to a second device or system for processing. The first device may have basic speech processing capabilities sufficient for handling basic language and/or commands, while the second device (e.g., an edge device and/or a remote system) may call on additional language models, entity libraries, skill components, etc. to perform additional tasks. An intermediate data generator may facilitate dividing speech processing operations between devices by generating a stream of data that includes a first-pass ASR output (e.g., a word or sub-word lattice) and other characteristics of the audio data such as whisper detection, speaker identification, media signatures, etc. The second device can perform the additional processing using the data stream; e.g., without using the audio data. Thus, privacy may be enhanced by processing the audio data locally without sending it to other devices/systems.

20 Claims, 13 Drawing Sheets

SCHEDULING NEURAL INFERENCE TASKS

BACKGROUND

Computer systems may employ machine learning algorithms to perform tasks that may involve recognizing patterns and/or sequences in data and making inferences and/or predictions. Examples of machine learning algorithms include linear regression, logistic regression, artificial neural networks, decision tress, naïve Bayes, random forest, and others. Machine learning algorithms may process training data to build a model. A machine learning model may have many parameters (e.g., weights) trained using various techniques such as supervised learning, unsupervised learning, and/or reinforcement learning. Machine learning models have many applications including but not limited to: computer vision, fingerprint/facial recognition, object recognition, acoustic event detection, simultaneous localization and mapping, automatic speech recognition (ASR), natural language understanding (NLU), natural language generation (NLG), text-to-speech (TTS), and others.

BRIEF DESCRIPTION OF DRAWINGS

For a more complete understanding of the present disclosure, reference is now made to the following description taken in conjunction with the accompanying drawings.

DETAILED DESCRIPTION

Figure 1:
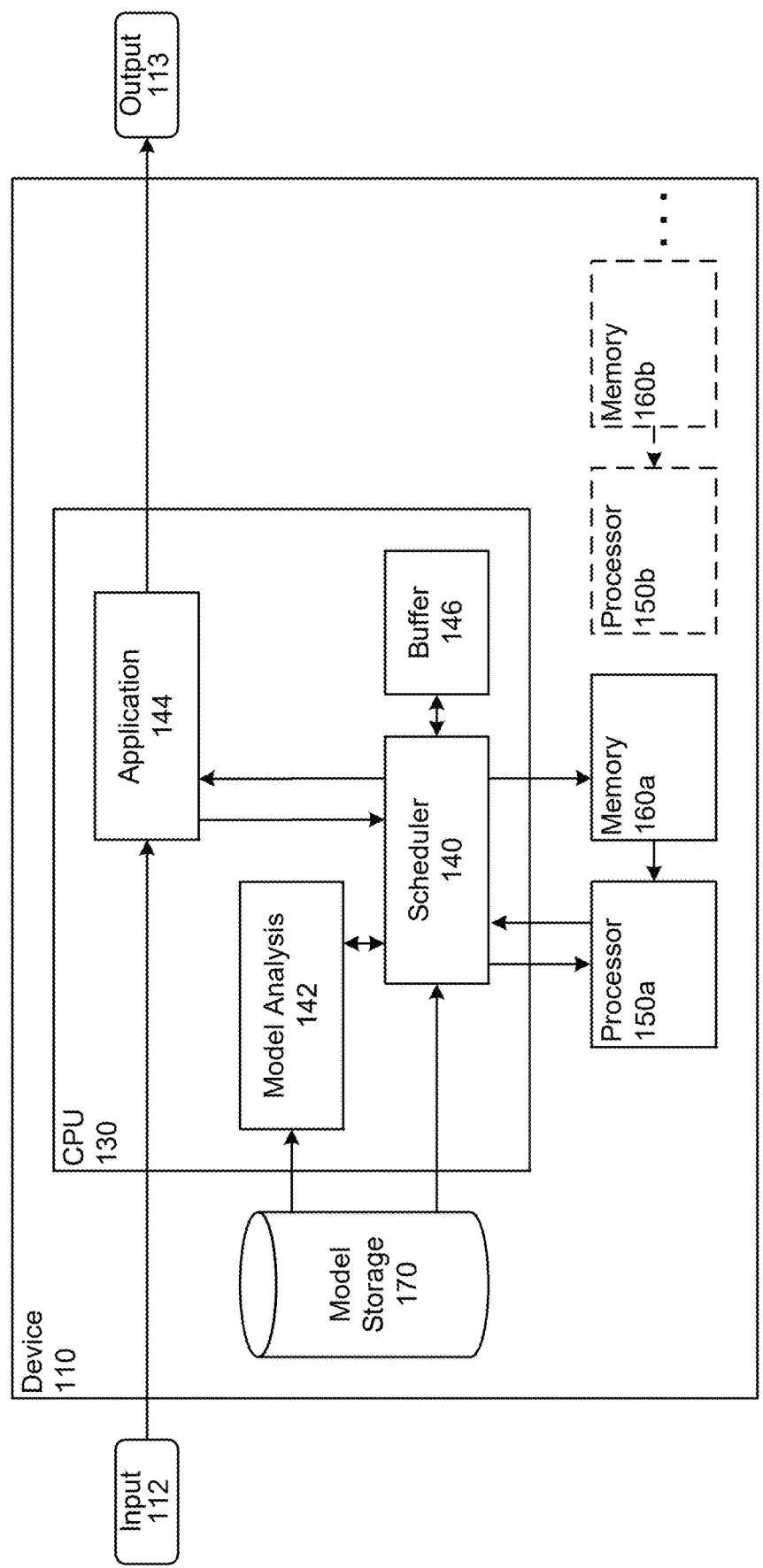
FIG. 1 is a conceptual diagram illustrating example components of a device capable of scheduling neural inference tasks, according to embodiments of the present disclosure.

Artificial neural networks (ANNs) are a type of computing system that employ machine learning to train interconnected units—e.g., artificial neurons—to process input data and perform an inference task to generate an output. ANNs may consist of multiple layers of units may include an input layer that may receive the input data, an output layer that may generate the output signal, and, in some cases, one or more "hidden layers" between the input and output layers. A unit may receive inputs (e.g., from other units, the input, a memory, and/or its own output), apply weights to the inputs, combine the weighted inputs using a mathematical function, and/or apply an activation function to generate an output. An ANN may be described by a model, which may include hyperparameters and parameters. The parameters may be weights learned during training. Hyperparameters may be characteristics of the model set prior to training (e.g., number of layers, number of neuron per layer, and characteristics related to training/learning).

A computing system may perform a neural inference task by loading a model into a memory associated with a processor. The processor may then use the model to process an input. Some computing systems may perform many inferences using different models. For example, a speech processing system may continuously process audio data with various models to detect a wakeword. Upon detecting a wakeword (or receiving another indication to begin processing audio data), the system may process the audio data with other models to identify commands in the speech; for example, automatic speech recognition (ASR) models and/ or natural language understanding (NLU) models. The speech processing system may run additional models for making determinations related to the speech processing; for example, models for whisper detection, speaker identification, wakeword verification, and/or endpoint detection. While processing a spoken utterance, the system may call upon each individual model to perform an inference task many times during and after the utterance. For each inference task, the system may load a model and process an input. At each stage, the system may be limited by both static and/or dynamic resource constraints. For example, a model may require a memory space allocation large enough for the model, but may also require a certain amount of time to load into memory. Similarly, the model may require a certain amount of processing resources (e.g., "compute") to process an input; however, different models may be called with different frequencies and have different impact on downstream processes. Accordingly, it may be desirable to run certain models to maximize throughput (e.g., by buffering the input and processing it in batches), while running other models to minimize latency (e.g., by processing each input individually as it is received). Although speech processing is used as an example to illustrate the systems and methods for scheduling neural inference tasks described herein, the techniques described may apply to any computing system that performs neural inference tasks using different models.

This disclosure describes systems and methods for scheduling neural inference tasks. The scheduler can inspect neural tasks (e.g., by analyzing the code or reading metadata associated with the code) to determine static and/or dynamic requirements for resource such as compute and/or memory bandwidth. Different neural tasks may employ different models having different resource utilizations. For example, a wakeword detection task may use a convolutional neural network (CNN) model that may be relatively small in terms of memory usage but may use a relatively large amount of compute. Conversely, an ASR task may use a long short-term memory (LSTM) neural network that may have a relatively large memory footprint but may use a relatively small amount of compute. The scheduler may thus take into account the time it may take to load the model into memory versus the time it may take to process an input using the model.

In some implementations, the scheduler may organize neural tasks based on various objectives depending on the model and/or resources required; for example, the scheduler may prioritize resource utilization (e.g., efficient allocation of compute and/or memory bandwidth), quality of service (QOS; e.g., throughput), and/or latency (e.g., reducing time elapsed between receiving input and generating an output using the particular model for that task). For example, some neural tasks such as those involved in whisper detection may be called frequently (e.g., on every frame of audio data) but may not represent a critical path in the time to execute the command. Accordingly, whisper detection tasks may be performed in batches to, for example, increase resource utilization and throughput (by reducing the number of times the system loads the model) at the expense of latency in in the whisper detection result (due to inputs being held in a buffer until batch processing occurs).

In some implementations, the scheduler may break up a neural task into atomic units. For example, ASR processing may involve processing audio data with an acoustic model to determine acoustic unit data, followed by processing acoustic unit data using a language model to determine one or more ASR hypotheses (e.g., possible transcriptions of speech represented in the audio data). The scheduler may inspect such a neural task to determine, for example, that the task involves using a first model to process an input to generate intermediate data, and using a second model to process the intermediate data to generate an output. The scheduler may thus consider each atomic neural task and its resource requirements individually when scheduling.

The neural inference task scheduler may therefore improve over previous schedulers due to its ability to consider memory bandwidth (e.g., in addition to memory allocation and compute), manage resources over time under dynamic conditions, inspect neural tasks to determine static and dynamic resource requirements, break down tasks into atomic units and schedule the atomic units separately, and schedule various tasks to optimize for respective goals (e.g., efficiency versus latency). The aforementioned features are provided as examples, and maybe used in combination with each other and/or with additional features described herein.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating example components of a device 110 capable of scheduling neural inference tasks, according to embodiments of the present disclosure. The device 110 may receive input data 112 and perform one or more neural tasks on the input data 112 to generate output data 113. The device 110 may include a central processing unit (CPU) 130, a model storage component 170, one or more processors 150a, 150b, etc. (collectively "processors 150"), and one or more memory components 160a, 160b, etc. (collectively "memory components 160"). For executing a neural task, the CPU 130 may select a processor 150 for processing the task, identify model data corresponding to the task in the model storage component 170, and load the model data into the memory 160 associated with the identified processor 150. In some implementations, the device 110 may include one processor 150 and one memory 160 associated with the processor 150. In some implementations, the device 110 may have two or more processors 150, where the processors 150 are respectively coupled to an associated memory 160. In some implementations, a memory 160 may be shared by more than one processor 150.

The processor(s) 150 may include single- or multi-core microprocessors. The processor(s) 150 may be suitable for performing mathematical operations used in neural networks; for example, vector and/or matrix multiplication. The processor(s) 150 may include one or more digital signal processors (DSPs), graphics processing units (GPUs), and or neural network accelerators. The processor(s) 150 may be specially adapted for processing blocks of data in parallel including retrieving model data from the memory(ies) 160 and using the model data to process input data.

The memory(ies) 160 may include one or more random access memory (RAM) modules. A memory 160 may be connected via a high-speed data connection to the CPU 130 and/or one or more of the processors 150. In some implementations, the memory(ies) 160 may be integrated within an integrated circuit (IC) or system on chip (SoC) package housing the CPU 130 and/or a memory 160. In some implementations, the memory(ies) 160 may reside a separate IC package. The memory(ies) 160 may be used to temporarily store model data for use by a processor 150 in performing a neural inference task. The model data may be loaded into a memory 160 from the model storage component 170 under the command of the scheduler 140.

The data buffer 146 may store data temporarily for eventual processing by one or more of the processors 150. For example, when the scheduler 140 schedules batch processing of portions of input data, the scheduler 140 may cause the input data to be stored in the data buffer 146 until such time as the data can be sent to the processors 150 for processing. In some cases, the scheduler 140 may store data representing results from performing a first neural task, such that the results data can be processed using a second neural task (e.g., storing the output of a recurrent neural network (RNN) encoder for inputting into an RNN decoder). In some cases, the data buffer 146 may store other state information (e.g., an LSTM cell state vector).

The CPU 130 may include one or more integrated circuits including one or more microprocessors and/or microprocessor cores and one or more memory components. The CPU 130 may load and execute instructions including, but not limited to, a kernel, an operating system, one or more applications, one or more device drivers, etc. In some implementations, the CPU 130 may be a SoC; for example, including an integrated package additionally including a graphics processor, memory controller, and/or modem. The CPU 130 may include or execute various components as shown in FIG. 1; including, but not limited to, a scheduler 140, a model analysis component 142, one or more applications 144, and/or a data buffer 146. The components may include software, hardware, or a combination of hardware or software.

The application 144 may include executable code for receiving the input data 112, identifying one or more neural tasks to perform using the input data 112, calling on the scheduler 140 to execute the neural tasks, and performing pre- and post-processing operations such as extracting features of the input data 112 and/or generating requests to send to other components, devices, and/or systems based on a result of performing the task. In some implementations, the application 144 may orchestrate one or more neural task pipelines in which multiple neural tasks are called to process the input data 112 and/or results of other previously performed neural tasks. The application 144 may call on the scheduler 140 to execute a neural task; e.g., to make a neural inference regarding the input using one or more models retrieves from the model storage component 170 and stored in a memory 160. Results of neural tasks may be returned as output data 113. The output data 113 may be output directly to a user and/or sent to another system (e.g., the system 520 and/or 525 as described below with reference to FIG. 5) for further processing.

The model analysis component 142 may analyze the application 144 and/or model data in the model storage component 170 to determine characteristics of individual neural tasks, models, and/or neural task pipelines described by the application 144. In some cases, certain characteristics may be described in metadata associated with the model data. The metadata may be prepared by a designer/trainer of the model data and/or prepared automatically by the model analysis component 142; for example, during an offline analysis such that the model analysis component 142 (or other component of the device 110) can determine characteristics of the model quickly during runtime. In some cases, the model analysis component 142 may analyze the model data itself to determine the characteristics. For example, and without limitation, the model analysis component 142 can determine resource usage metrics of a task such as model size (e.g., in kilobytes/megabytes, etc.) and/or compute (e.g., processor operations to determine a result). The model analysis component 142 may determine a neural network model architecture (e.g., CNN, LSTM, recurrent neural network transducer (RNN-T), transformer, etc.). The model analysis component 142 may determine time dependencies of a task, such as whether the model processes data sequentially (e.g., consecutive frames of audio data or image data). The model analysis component 142 may determine a data interdependency of a task, such as whether an operation uses an output of a previous operation of the task. The model analysis component 142 may determine a task interdependency, such as whether a task takes as input the result of a different task (e.g., an ASR decoder model may process an output of an ASR encoder model rather than the input data 112 itself). The model analysis component 142 may determine whether a model is decomposable (e.g., whether data can be processed with a portion of the model such as individual filters). The model analysis component 142 may determine a priority of a task; for example, a task whose delay may have a measurable effect on latency may be given a higher priority than a task that can be performed at different points in a neural task pipeline without delaying delivery of the ultimate result. The model analysis component 142 may send determined characteristics for tasks and/or models to the scheduler 140.

The scheduler 140 may include software and/or logic for handling the execution of neural tasks on the processor 150. For example, the scheduler 140 may orchestrate loading model data in a memory 160 and providing data to the processor 150 for processing using the model data. The scheduler 140 may receive calls for executing multiple tasks, and organize the various task operations including loading the respective models and processing the data. In some implementations, the scheduler 140 may distribute the operations between multiple processors 150 and/or memories 160. The scheduler 140 may organize the operations in time to achieve operational goals; for example, maximizing resources utilization, minimizing latency of an individual task or a multi-task pipeline, and/or maximizing throughput for a particular task. The scheduler 140 may schedule task operations based on the characteristics determined by the model analysis component 142.

For example, a neural task pipeline may involve performing a first neural task and a second neural task on a sequence of input data chunks (e.g., portions). The model analysis component 142 may determine that a second neural task has a higher priority, but uses a much larger model than the first neural task (e.g., in terms of number of bytes, parameters, connections, layers, etc.). The scheduler 140 may thus load the first model associated with the first task into the memory 160 (which it can do relatively quickly) and begin processing the input data. While the processor 150 is performing the first task, the scheduler 140 can load the second model into the memory 160. When the second model is fully loaded, the scheduler 140 can terminate the processing associated with the first model, and begin processing the input data using the second model.

In another example of a pipeline involving first and second neural tasks, the model analysis component 142 may determine that the second neural task has a higher priority than the first neural task, and that the a sum of the size of the first model and the second model exceeds a capacity of the memory 160. The model analysis component 142 may determine, however, that the first model may be decomposed. Thus, the model analysis component 142 may determine that the memory 160 may have capacity for the second model and a portion of the first model. In order to maximize resource utilization and without increasing latency with regard to the second neural task, the scheduler 140 may cause only a first portion of a first model associated with the first task to be loaded into memory. The scheduler 140 may cause the processor 150 to process some input data using the first portion of the model. During the processing, the scheduler 140 may cause the memory 160 to load the second model. Once the second model is loaded into the memory 160, the scheduler 140 may cause the processor 150 to process the input data using the second model. During the processing, the scheduler 140 may cause the processor to load the second portion of the first model. When the processor 150 completes the processing using the second model, the scheduler 140 may cause the processor 150 to begin processing the input data using the second portion of the first model.

In yet another example, the model analysis component 142 may determine that a high-priority neural task (e.g., a task on a critical path with regard to latency), may process input data independently; that is, processing a second portion of the input data does not depend on a result of processing the first portion. Thus, in a device 110 with multiple processors 150a and 150b, the model can process a batch of input data in parallel. The scheduler 140, based on the priority of the task and on the data independence of the model, may load the model into both a first memory 160a associated with the first processor 150a and a second memory 160b associated with the second processor 150b. The scheduler 140 may then cause the processors 150 to execute the input data at least partially in parallel. In some implementations, the processor 150a and 150b may process the input data using model data stored in a single, shared memory. In either case, processing the input in parallel may reduce latency, but possibly at the expense of a memory penalty (e.g., loading the same model twice into two different memories, or reading the model from a single memory with two processors).

In yet another example, the model analysis component 142 may determine that a first neural task has a high-priority (e.g., a task on a critical path with regard to latency). The scheduler 140 may thus use the timing of processing of the first task to set a cadence for other tasks. The other tasks may, for example, use smaller models that load faster and/or require less compute and thus process faster. Processing tasks according to, for example, timestamps indicating a time received may result in queuing various tasks without regard for time sensitivity of the task (e.g., which tasks have a greater effect on perceived latency). Processing tasks according to priority, however, may allow a higher-priority task processing data in a data stream to advance ahead of other tasks which, although lower in priority, may still be important. For example, one high priority task may have the ability to process large amounts of data while a lower priority task may process smaller portions of data (e.g., a first speech processing task may process a second or more of audio data while a second speech processing task may only process 30 ms at a time). Thus, in some implementations, the scheduler 140 may set a cadence for processing based on a particular task. The cadence approach may allow the scheduler 140 to organize tasks according to both priority and timestamp. For example, the scheduler 140 may set a timestamp window, keyed to the processing of the first task. Each time the task processes a chunk of data, the window may be set according to, for example, a timestamp of the last data processed by the first task. The scheduler 140 may only allow other tasks to process data having timestamps within the window. The window size (e.g., representing a range of timestamps), may be set according to a time it takes the first task to process a chunk of data. For example, if the first task can process a chunk of data in 10 ms, the scheduler may set the window to 10 ms (allowing other tasks to process tasks at a same overall rate as the first task, but no faster), 20 ms (allowing other tasks to process the tasks at twice the rate of the first task, but no faster), etc. In some implementations, the model analysis component 142 and/or the scheduler 140 may make additional determinations regarding priority and interweaving of operations corresponding to different tasks. FIGS. 7 through 10 illustrate examples of various scheduling strategies.

Figure 2:
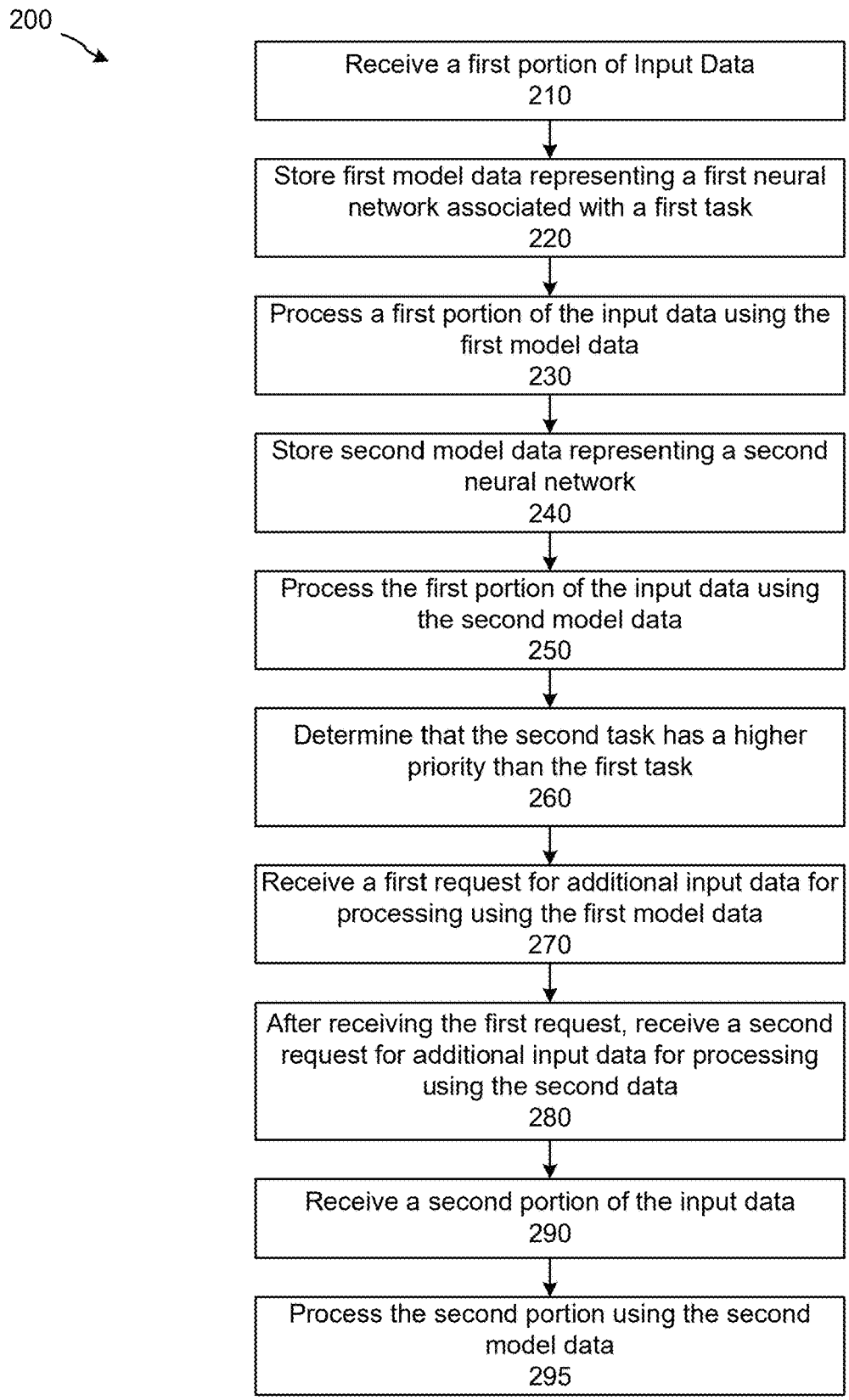
FIG. 2 is a flowchart illustrating example operations of a method of scheduling neural inference tasks, according to embodiments of the present disclosure.

FIG. 2 is a flowchart illustrating example operations of a method 200 of scheduling neural inference tasks, according to embodiments of the present disclosure. The method 200 may be performed by components of the device 110. The method 200 may include receiving (210) a first portion of input data. The input data may include a plurality of sequential data portions including the first portion and a second portion, etc. The method 200 may include storing (220) first data in a first memory (e.g., the first memory 160a) associated with a first processor (e.g., the first processor 150a). The first data may represent a first neural network associated with a first neural task. The method 200 may include processing (230) the first portion of the input data using the first processor 150a and the first data. The method 200 may include storing (240) second data in the first memory 160a. The second data may represent a second neural network associated with a second neural task. The method 200 may include processing (250) the first portion of the input data using the first processor 150a and the second data. The method 200 may include determining (260) that the second task has higher priority than the first task. For example, the model analysis component 142 and/or the scheduler 140 may determine that the second task may represent part of a critical path for perceived latency and/or may represent a resource-intensive task. In some implementations, the model analysis component 142 and/or the scheduler 140 may make additional determinations regarding priority and interweaving of operations corresponding to different tasks. FIGS. 7 through 10 illustrate examples of various scheduling strategies. The method 200 may include receiving (270) a first request for additional input data for processing using the first data. The method 200 may include, after receiving the first request, receiving (280) a second request for additional input data for processing using the second data. After receiving the requests, the method 200 may include receiving (290) the second portion of the input data. The method 200 may include, in response to determining that the second task has higher priority than the first task processing (295), the second portion using the first processor and the second data. In this manner, the scheduler 140 may reduce latency by prioritizing a later-received request over and earlier-received request.

Although the FIG. 2 illustrates certain stages/steps in a particular order, the steps described may be performed in a different order and/or during overlapping time periods (as well as certain steps removed or added) without departing from the present disclosure.

Figure 3:
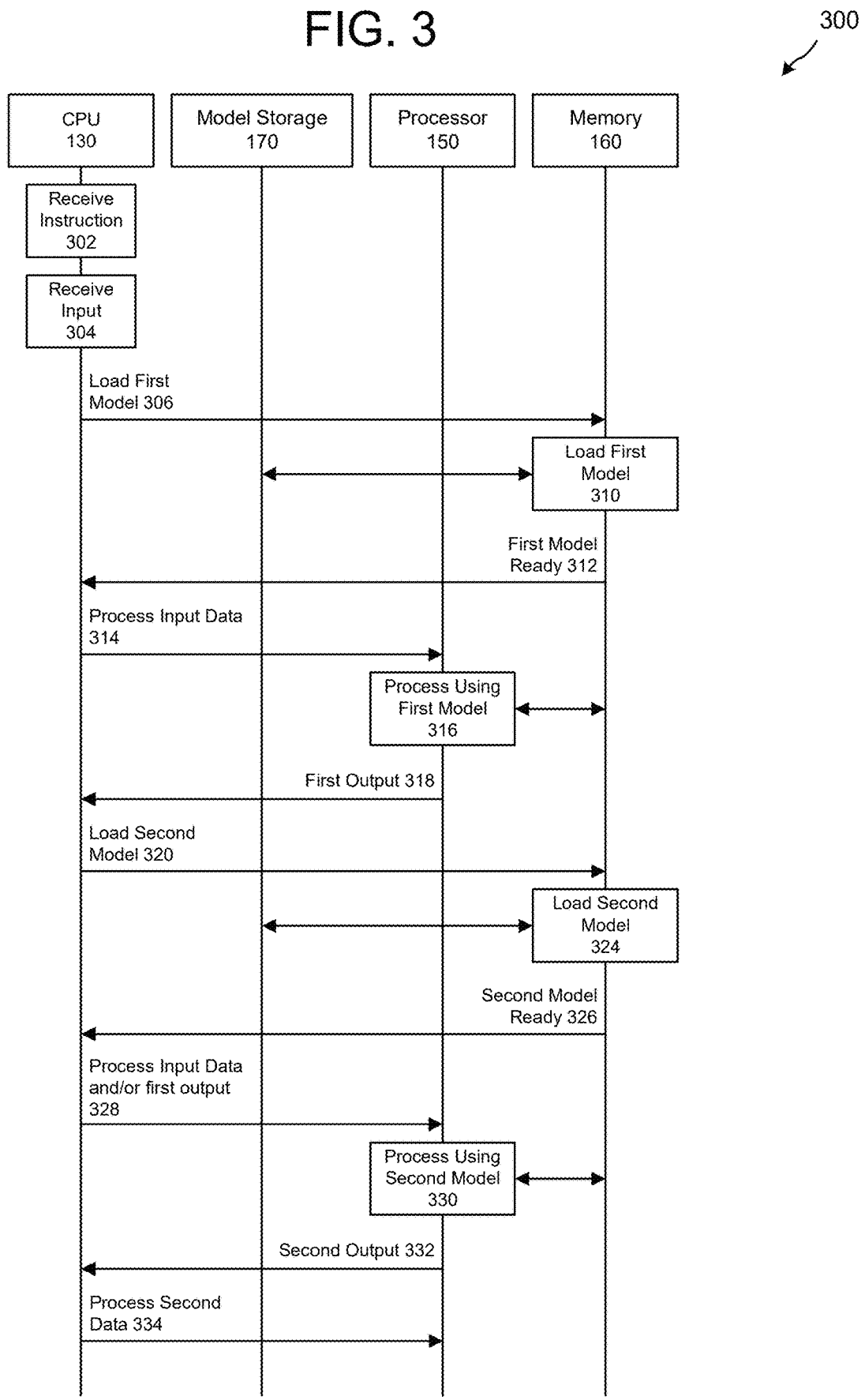
FIG. 3 is a signal flow diagram illustrating example operations of a system for scheduling neural inference tasks, according to embodiments of the present disclosure.

FIG. 3 is a signal flow diagram illustrating example operations 300 of a system for scheduling neural inference tasks, according to embodiments of the present disclosure. The operations 300 may execute on a device 110 as previously described. FIG. 3 illustrates a scenario in which the device 110 receives input data and performs a first neural task on a first portion of the input data and a second neural task on the first portion and a second portion of the input data.

The operations 300 may include receiving (302) instructions describing one or more neural tasks to perform using input data. The neural tasks may be independent neural tasks; e.g., that process the input separately to determine respective results that do not depend on the other task's result. Or they neural tasks may represent stages of a neural task pipeline in which a result of a first task becomes an input to a second task. The instructions may describe the neural tasks to be performed and/or any such interdependencies.

The operations 300 may include receiving (304) input data. Based on the instructions received at the stage 302, the CPU 130 may cause (306) the memory 160 to load (310) first model data representing a first neural network associated with the first task from the model storage component 170. When the memory 160 has loaded the first model data, the memory 160 may send (312) an indication to the CPU 130 that the first model data is available for use in processing data. The CPU 130 may send (314) a command to the processor 150 to process the input data. The processor 150 may process (316) the input data using the first model data now stored in the memory 160. The processor 150 may return (318) first output data to the CPU 130.

The CPU 130 may cause (320) the memory 160 to load (324) second model data representing a second neural network associated with the second task from the model storage component 170. When the memory 160 has loaded the second model data, the memory 160 may send (326) an indication to the CPU 130 that the second model data is available for use in processing data. Depending on the instructions received at the stage (302), the CPU 130 may send (328) a command to the processor 150 to process the input data and/or the first output data. The processor 150 may process (330) the data using the second model data now stored in the memory 160. The processor 150 may return (332) second output data to the CPU 130. The operations 300 may continue with processing (334) data according to various neural tasks as set forth in the instructions.

Figure 4:
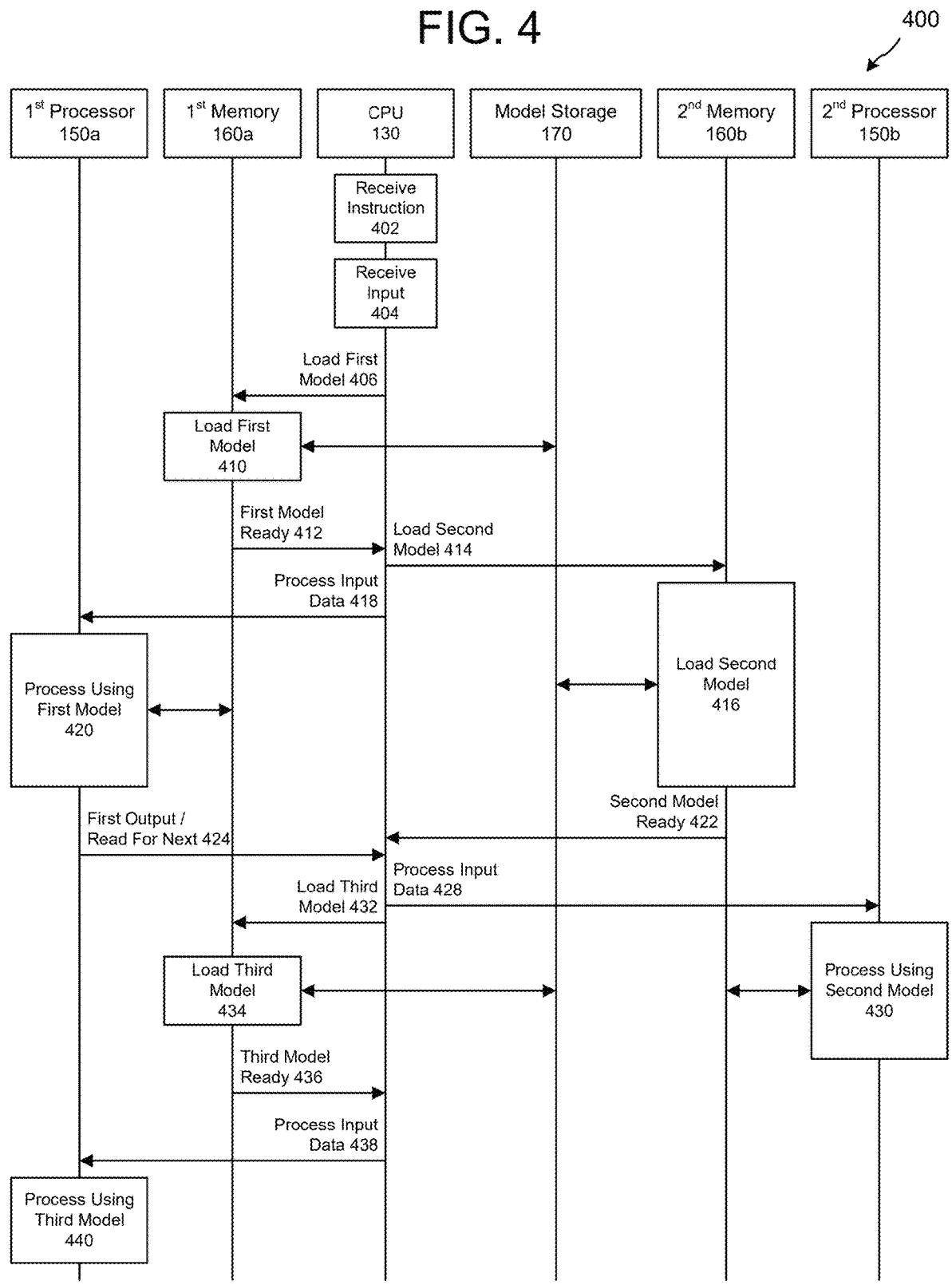
FIG. 4 is a signal flow diagram illustrating example operations of a system for scheduling neural inference tasks on multiple processors, according to embodiments of the present disclosure.

FIG. 4 is a signal flow diagram illustrating example operations 400 of a system for scheduling neural inference tasks on multiple processors, according to embodiments of the present disclosure. The operations 300 may execute on a device 110 as previously described. FIG. 4 illustrates a scenario in which the device 110 receives input data and performs a first neural task on the input data using a first processor 150*a* and a first memory 160*a*, a second neural task on the input data using a second processor 150*b* and a second memory 160*b*, and a third neural task on the input data using the first processor 150*a* and the first memory 160*b*. The scheduler 140 may interweave the operations 400 to increase utilization by, for example, loading a model into the one memory while processing data using a model already loaded into the other memory.

The operations 400 may include receiving (402) instructions describing one or more neural tasks to perform using input data. The neural tasks may be independent neural tasks; e.g., that process the input separately to determine respective results that do not depend on the other task's result. Or they neural tasks may represent stages of a neural task pipeline in which a result of a first task becomes an input to a second task. The instructions may describe the neural tasks to be performed and/or any such interdependencies. The operations 400 may include receiving (404) input data. Based on the instructions received at the stage 402, the CPU 130 may cause (406) a first memory 160*a* to load (410) first model data representing a first neural network associated with the first neural task from the model storage component 170. When the first memory 160*a* has loaded the first model data, the first memory 160*a* may send (412) an indication to the CPU 130 that the first model data is available for use in processing data.

When the CPU 130 receives the indication that the first model data has complete loading, the CPU 130 may initiate another loading operation on another memory. In this manner, the CPU 130 can interweave loading and processing operations to increase utilization of the processor 150 and memories 160. Thus, the CPU 130 may cause (414) a second memory 160*b* to load (416) second model data representing a second neural network associated with the second neural task from the model storage component 170. When the second memory 160*b* has loaded the second model data, the second memory 160*b* may send (422) an indication to the CPU 130 that the second model data is available for use in processing data.

Meanwhile, the CPU 130 may send (418) a command to the first processor 150*a* to process the input data. The first processor 150*a* may process (420) the input data using the first model data now stored in the first memory 160*a*. The first processor 150*a* may return (424) first output data to the CPU 130. Thus, the processing stage 420 may occur at least partially in parallel with the loading stage 416.

When the first processor 150*a* returns the first output data during the stage 424, the first processor 150*a* may indicate to the CPU 130 that it is ready for additional data to process. The CPU 130 may determine, however, based on previously receiving the indication at the stage 422, that the model storage component 270 is available for loading new model data into a memory. The CPU 130 may increase utilization of the processor 150 and/or memories 160 by loading third model data into the first memory 160*a* to prepare for performing a third neural task. Thus, the CPU 130 may cause (432) the first memory 160*a* to load (434) the third model, which represents a third neural network associated with a third neural task.

Meanwhile, and based on the indication received during the stage 422, the CPU 130 may send (428) a command to the second processor 150*b* to process the input data. The second processor 150*b* may process (430) the input data using the second model data now stored in the second memory 160*b*. Thus, the processing stage 430 may occur at least partially in parallel with the loading stage 434.

When the first memory 160*a* has loaded the third model data, the first memory 160*a* may send (436) an indication to the CPU 130 that the third model data is available for use in processing data. The CPU 130 may send (438) a command to the first processor 150*a* to process the input data. The first processor 150*a* may process (440) the input data using the third model data now stored in the first memory 160*a*. The operations 400 may continue with processing data according to various neural tasks as set forth in the instructions.

Figure 5:
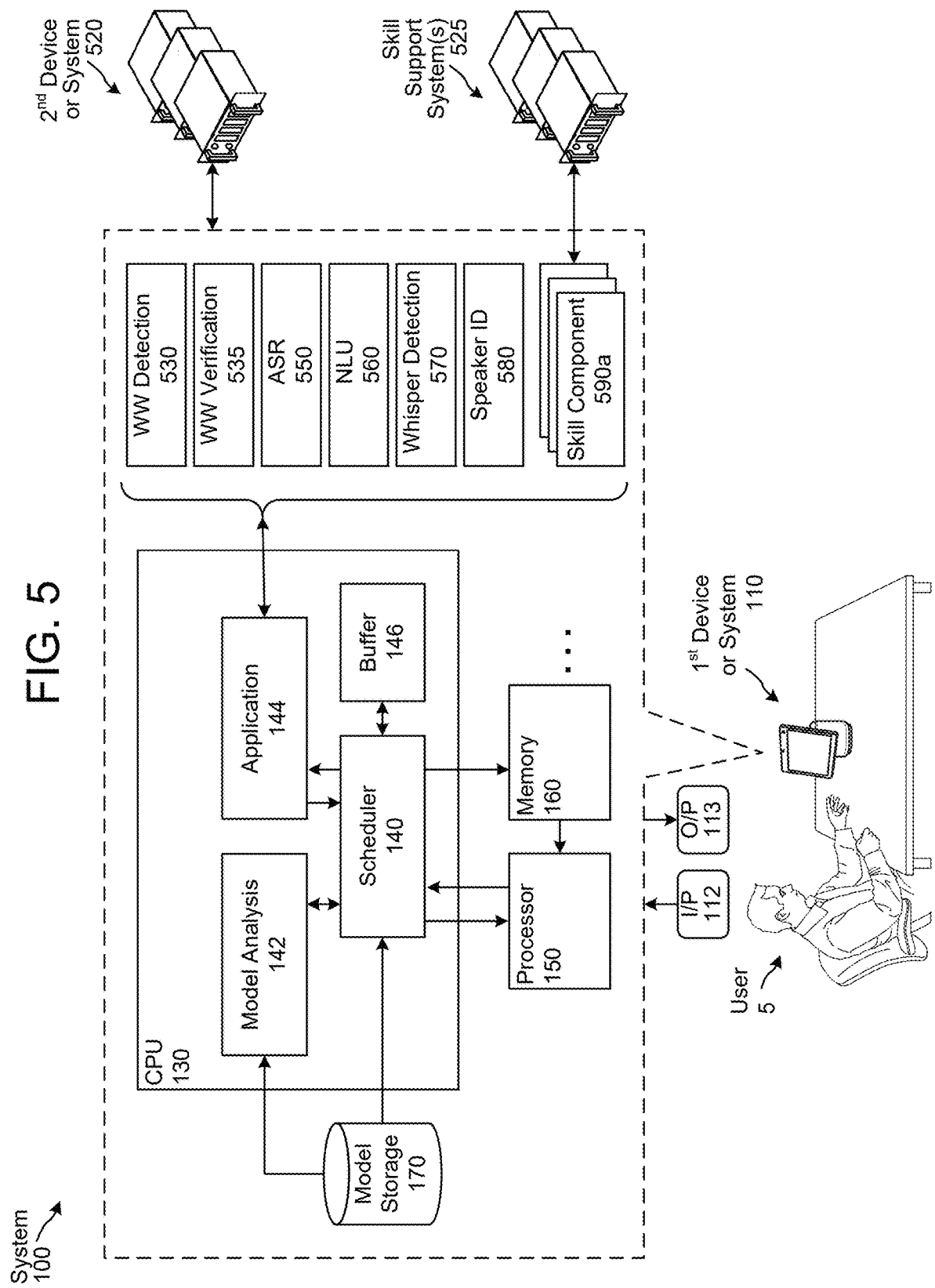
FIG. 5 is a conceptual diagram illustrating example components of a system for scheduling neural inference tasks related to speech processing, according to embodiments of the present disclosure.

FIG. 5 is a conceptual diagram illustrating example components of a system 100 for scheduling neural inference tasks related to speech processing, according to embodiments of the present disclosure. As shown in FIG. 5, the system 100 may include the device 110 local to a user 5 and in communication with a second device or system 520 over one or more computer networks including, for example, the network 199 (shown in FIGS. 11 through 13). The device 110 may include various skill components 590*a*, 590*b*, 590*c*, etc. (collectively "skill components 590"). Skill components 590 may add capabilities to the device 110 to, for example, perform an action such as generating a response and/or doing something in the physical environment based on a request from the CPU 130. The device 110 may include the CPU 130, model storage component 170, one or more processors 150, and one or more memory components 160 previously described. The CPU may include the scheduler 140, model analysis component 142, application 144, and/or the data buffer 146 as previously described.

The device 110 may include additional components related to speech processing including, for example and without limitation, a wakeword detection component 530, a wakeword verification component 535, an ASR component 550, an NLU component 560, a whisper detection component 570, and/or a speaker identification component 580. In some implementations, the device 110 may include fewer or additional components. Other example components that may involve processing neural tasks may include acoustic event detection (AED), echo-spatial perception (ESP), fingerprinting (e.g., suppressing false wakeword detections resulting from media playback), natural language generation (NLG), text-to-speech (TTS), etc. The components may include software and/or hardware configured to make certain determinations supported by neural tasks performed using the one or more processors 150 and memory components 160.

The device 110 may receive input data 112 from the user 5 including audio corresponding to an utterance (e.g., a spoken natural language input). The device 110 may process audio following detection of a wakeword (e.g., using the wakeword detection component 530 as described below)

and/or detection of another indication to begin receiving input (e.g., a gesture such as a button press). The device 110 may generate audio data corresponding to the audio, and may process the audio data locally and/or send data to the system 520 for processing. The device 110 may send the audio data to the system 520 via the application 144. The application 144 may be installed on the device 110 and associated with the system 520. An example of such an application 144 is the Amazon Alexa application that may be installed on a smart phone, tablet, or the like. In some implementations, the device 110 may receive and/or generate other forms of input data 112 such as text data and/or image data. The device 110 may process the input data 112 locally and/or request additional processing from the system 520. The device 110 (and/or other devices 110) may respond by performing an action responsive to the audio, such as such as outputting synthesized speech or doing something in the physical world; for example, rolling down a car window or turning on a house light. Examples of various devices 110 are described with reference to FIG. 13, and hardware of an example device 110 is described with reference to FIG. 11. The system 520 may be remote system such as a group of computing components located geographically remote from device 110 but accessible via network 199 (for example, servers accessible via the internet). The system 520 may also include a remote system that is physically separate from device 110 but located geographically close to device 110 and accessible via network 199 (for example a home server located in a same residence as device 110). System 520 may also include some combination thereof, for example where certain components/operations are performed via a home server(s) and others are performed via a geographically remote server(s). An example system 520 is described with reference to FIG. 12.

Operations of the device 110 (and/or the remote system 520) may begin when the device 110 detects a wakeword or receives some other input data 112 such as text data, image data, a button press indicating an invocation of a virtual assistant, etc. The device 110 may include a microphone or array of microphones that may capture audio for generating corresponding audio data. Once speech is detected in audio data representing the audio, the device 110 may determine if the speech is directed at the device 110/system 520. In at least some embodiments, such determination may be made using a wakeword detection component 530. The wakeword detection component 530 may be configured to detect various wakewords. In at least some examples, each wakeword may correspond to a name of a different digital assistant. An example wakeword/digital assistant name is "Alexa." In another example, input to the system may be in form of text data, for example as a result of a user typing an input into a user interface of device 110. Other input forms may include indication that the user has pressed a physical or virtual button on device 110, the user has made a gesture, etc. The device 110 may also capture images using camera(s) 1118 of the device 110 and may send image data representing those image(s) to the system 520. The image data may include raw image data or image data processed by the device 110 before sending to the system 520.

The wakeword detection component 530 of the device 110 may process the audio data, representing the audio, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio, is analyzed to determine if specific characteristics of the audio data match preconfigured acoustic waveforms, audio signatures, or other data corresponding to a wakeword.

Thus, the wakeword detection component 530 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 530 may be built on deep neural network (DNN)/recursive neural network (RNN) structures directly (e.g., possibly including a CNN), without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Thus, wakeword detection may include performing a neural task using one or more of the DNN/RNN models discussed above. The CPU 130 may cause the model data representing the wakeword detection model to be loaded into a memory 160. The CPU 130 may cause the processor 150 to processes input audio data continuously using the model data, and may discard the audio data after a short time unless a wakeword is detected. The scheduler 140 may interweave wakeword detection tasks with other neural tasks; for example, acoustic event detection (AED).

In some implementations, the scheduler 140 may interweave neural tasks using respective model data to detect different wakewords. For example, in some implementations, the system 100 may include multiple command processing subsystems. The subsystems may respond to different wakewords and/or perform different categories of tasks. Each subsystem may be associated with its own wakeword such that speaking a certain wakeword results in audio data be sent to and processed by a particular subsystem. For example, detection of the wakeword "Alexa" by the wakeword detection component 530 may result in sending audio data to a first subsystem for processing while detection of the wakeword "Computer" by the wakeword detector may result in sending audio data to a second subsystem for processing. In some implementations, the system 100 may have a separate wakeword and system for different skills/systems (e.g., "Dungeon Master" for a game play skill/system 520) and/or such skills/systems may be coordinated by one or more skill component(s) 590 of one or more subsystems.

Once the wakeword is detected by the wakeword detection component 530 and/or input is detected by an input detector, the device 110 may "wake" and begin calling other neural tasks to process the audio data. For example, the CPU 130 may call on the ASR component 550 to transcribe the audio data (e.g., by processing the audio data using one or more ASR models) and the wakeword verification component 535 to either confirm the wakeword detection or suppress a false wakeword detection (e.g., by processing the audio data using one or more wakeword verification models). The wakeword verification component 535 may process a portion of the audio data potentially corresponding to the detected wakeword, and call upon a neural task using a model different from that used for wakeword detection. If the wakeword verification component 535 determines that the wakeword detection was erroneous, the CPU 130 may cause the audio data to be discarded and terminate any further speech processing. If the wakeword verification component 535 confirms the wakeword detection, the CPU 130 may continue speech processing operations.

The device 110 may perform both the ASR neural tasks and the wakeword verification neural task on the audio data as it is generated. The ASR neural tasks and the wakeword verification neural tasks may have different resource requirements and/or priorities. The scheduler 140 may interweave the respective tasks; for example, to reduce latency in the ASR path and/or increase utilization of the processor 150 and/or memory 160. The scheduler 140 may take into account the different model types and sizes of the respective tasks. For example, the ASR task may involve an RNN such as an LSTM which may be a relatively large model in terms of memory footprint, but that uses relatively little compute. In contrast, the wakeword verification task may involve a smaller CNN model that may operate on large portions of data (e.g., seconds of audio data), but which also may be decomposed into smaller model portions. The scheduler 140 may thus decompose, prioritize, and/or interweave these tasks to achieve operational objectives related to latency, throughput, and/or resource utilization.

The CPU 130 may send the audio data to the ASR component 550 and a natural language understanding (NLU) component 560. The ASR component 550 may transcribe the audio data into text data. The text data output by the ASR component 550 represents one or more than one (e.g., in the form of an N-best list) ASR hypotheses representing speech represented in the audio data. The ASR component 550 interprets the speech in the audio data based on a similarity between the audio data and pre-established models. For example, the ASR component 550 may compare the audio data with models for sounds (e.g., acoustic units such as phonemes, senons, phones, etc.) and sequences of sounds to identify words that match the sequence of sounds of the speech represented in the audio data. The models used for ASR may include one or more acoustic models, language models, and/or neural network encoder-decoders. Comparisons between the audio data features and the modeled sounds and/or sequences may be performed using one or more neural tasks. For example, the ASR component 550 may request execution of a neural task that includes processing the audio data with one or more of the models. In response, the CPU may load one or more of the models into a memory 160, and cause the processor to process the audio data using the model(s) in the memory 160. The ASR component 550 sends the text data generated thereby to an NLU component 560, via, in some embodiments, the CPU 130. The text data sent from the ASR component 550 to the NLU component 560 may include a single top-scoring ASR hypothesis or may include an N-best list including multiple top-scoring ASR hypotheses. An N-best list may additionally include a respective score associated with each ASR hypothesis represented therein.

The device 110 may further include a NLU component 560. The NLU component 560 may receive the text data from the ASR component. The NLU component 560 may attempts to make a semantic interpretation of the phrase(s) or statement(s) represented in the text data input therein by determining one or more meanings associated with the phrase(s) or statement(s) represented in the text data. The NLU component 560 may determine an intent representing an action that a user desires be performed and may determine information that allows a device (e.g., the device 110, the system(s) 520, a skill component 590, a skill support system(s) 525, etc.) to execute the intent. For example, if the text data corresponds to "play the $5^{th}$ Symphony by Beethoven," the NLU component 560 may determine an intent that the system output music and may identify "Beethoven" as an artist/composer and "5th Symphony" as the piece of music to be played. For further example, if the text data corresponds to "what is the weather," the NLU component 560 may determine an intent that the system output weather information associated with a geographic location of the device 110. In another example, if the text data corresponds to "turn off the lights," the NLU component 560 may determine an intent that the system turn off lights associated with the device 110 or the user 5.

The NLU component 560 may include one or more internal subcomponents that may leverage trained models to perform recognition, classification, and/or inference tasks. Such components may include a shortlister component, a Named entity recognition (NER), and/or an intent classification (IC) component, etc.

The shortlister component may select skills that may execute with respect to ASR output data received by the NLU component 560 (e.g., applications that may execute with respect to the user input). The ASR output data may include representations of text of an utterance, such as words, subword units, or the like. The shortlister component may limit downstream, resource-intensive NLU processes to processes related to a skill/skills that may execute with respect to the user input.

The shortlister component may include one or more trained models. The model(s) may be trained to recognize various forms of user inputs that may be received by the device 110 and/or device 110 and/or system(s) 520. For example, during a training period skill system(s) 525 associated with a skill may provide the device 110 and/or system(s) 520 with training text data representing sample user inputs that may be provided by a user to invoke the skill. For example, for a ride sharing skill, a skill support system(s) 525 associated with the ride sharing skill may provide the device 110 and/or system(s) 520 with training text data including text corresponding to "get me a cab to [location]," "get me a ride to [location]," "book me a cab to

[location]," "book me a ride to [location]," etc. The one or more trained models that will be used by the shortlister component may be trained, using the training text data representing sample user inputs, to determine other potentially related user input structures that users may try to use to invoke the particular skill. Each trained model of the shortlister component may be trained with respect to a different skill. Alternatively, the shortlister component may use one trained model per domain, such as one trained model for skills associated with a weather domain, one trained model for skills associated with a ride sharing domain, etc.

The NLU component 560 may include one or more recognizers. In at least some embodiments, a recognizer may be associated with a skill support system 525 (e.g., the recognizer may be configured to interpret text data to correspond to the skill support system 525). In at least some other examples, a recognizer may be associated with a domain such as smart home, video, music, weather, custom, etc. (e.g., the recognizer may be configured to interpret text data to correspond to the domain). If the shortlister component determines ASR output data is potentially associated with multiple domains, the recognizers associated with the domains may process the ASR output data, while recognizers not indicated in the shortlister component's output may not process the ASR output data. Each recognizer may include a named entity recognition (NER) component. The NER component may attempt to identify grammars and lexical information that may be used to construe meaning with respect to text data input therein. The NER component may identify portions of text data that correspond to a named entity associated with a domain, associated with the recognizer implementing the NER component. The NER component (or other component of the NLU component 560) may also determine whether a word refers to an entity whose identity is not explicitly mentioned in the text data, for example "him," "her," "it" or other anaphora, exophora, or the like.

For example, an NER component may parse text data to identify words as subject, object, verb, preposition, etc. based on grammar rules and/or models prior to recognizing named entities in the text data. An IC component (implemented by the same recognizer as the NER component) may use the identified verb to identify an intent. The NER component may then determine a grammar model associated with the identified intent. For example, a grammar model for an intent corresponding to <PlayMusic> may specify a list of slots applicable to play the identified "object" and any object modifier (e.g., a prepositional phrase), such as {Artist Name}, {Album Name}, {Song name}, etc. The NER component may then search corresponding fields in a lexicon (associated with the domain associated with the recognizer implementing the NER component), attempting to match words and phrases in text data the NER component previously tagged as a grammatical object or object modifier with those identified in the lexicon.

An NER component may perform semantic tagging, which is the labeling of a word or combination of words according to their type/semantic meaning. An NER component may parse text data using heuristic grammar rules, or a model may be constructed using techniques such as Hidden Markov Models, maximum entropy models, log linear models, conditional random fields (CRF), and the like. For example, an NER component implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component identifies "Play" as a verb based on a word database associated with the music domain, which an IC component (also implemented by the music domain recognizer) may determine corresponds to a <PlayMusic> intent. At this stage, no determination has been made as to the meaning of "mother's little helper" or "the rolling stones," but based on grammar rules and models, the NER component has determined the text of these phrases relates to the grammatical object (i.e., entity) of the user input represented in the text data.

Each recognizer may also include an intent classification (IC) component. An IC component may parse text data to determine an intent(s) (associated with the domain associated with the recognizer implementing the IC component) that potentially represents the user input. An intent represents to an action a user desires be performed. An IC component may communicate with a database of words linked to intents. For example, a music intent database may link words and phrases such as "quiet," "volume off," and "mute" to a <Mute> intent. An IC component identifies potential intents by comparing words and phrases in text data (representing at least a portion of the user input) to the words and phrases in an intents database (associated with the domain that is associated with the recognizer implementing the IC component). The comparing may be performed using one or more trained models.

The NLU component 560 may request execution—e.g., via the CPU 130—of these and other tasks using trained models. The scheduler 140 may organize NLU-related neural tasks according characteristics determined about the particular model (e.g., by the model analysis component 142 or as described in metadata associated with the model). In some cases, NLU-related neural tasks may be latency sensitive; however, NLU-related tasks may include large models and consume a relatively large amount of compute. Thus, the scheduler 140 may determine to execute NLU-related tasks quickly, but still reserve capacity for other neural tasks.

The NLU component 560 may return NLU results data (which may include tagged text data, indicators of intent, etc.) back to the CPU 130. The CPU 130 may forward the NLU results data to a skill component(s) 590. If the NLU results data includes a single NLU hypothesis, the NLU component 560 and the CPU 130 may direct the NLU results data to the skill component(s) 590 associated with the NLU hypothesis. If the NLU results data includes an N-best list of NLU hypotheses, the NLU component 560 and the CPU 130 may direct the top scoring NLU hypothesis to a skill component(s) 590 associated with the top scoring NLU hypothesis. The system may also include a post-NLU ranker which may incorporate other information to rank potential interpretations determined by the NLU component 560.

A skill component 590, may be software running on the device 110 and/or system(s) 520 that is akin to a software application. That is, a skill component 590 may enable the device 110 and/or system(s) 520 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The device 110 and/or system(s) 520 may be configured with more than one skill component 590. For example, a weather service skill component may enable the device 110 and/or system(s) 520 to provide weather information, a car service skill component may enable the device 110 and/or system(s) 520 to book a trip with respect to a taxi or ride sharing service, a restaurant skill component may enable the device 110 and/or system(s) 520 to order a pizza with respect to the restaurant's online ordering system, etc. A skill component 590 may operate in conjunction between the device 110 and/or system(s) 520 in order to complete certain functions. Inputs to a skill component 590 may come from speech processing interactions or through other interactions or input sources. A skill component 590 may include hardware, software, firmware, or the like that may be dedicated to a particular skill component 590 or shared among different skill components 590.

A skill support system(s) 525 may communicate with a secondary skill component(s) 590 within the device 110 and/or system(s) 520. A skill support system(s) 525 may be configured to perform one or more actions. An ability to perform such action(s) may sometimes be referred to as a "skill." That is, a skill may enable a skill support system(s) 525 to execute specific functionality in order to provide data or perform some other action requested by a user. For example, a weather service skill may enable a skill support system(s) 525 to provide weather information to the device 110 and/or system(s) 520, a car service skill may enable a skill support system(s) 525 to book a trip with respect to a taxi or ride sharing service, an order pi8 skill may enable a skill support system(s) 525 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The device 110 and/or system(s) 520 may be configured with a skill component 590 dedicated to interacting with the skill support system(s) 525. Unless expressly stated otherwise, reference to a skill, skill device, or skill component may include a skill component 590 operated by the device 110 and/or system(s) 520 and/or skill operated by the skill support system(s) 525. Moreover, the functionality described herein as a skill or skill may be referred to using many different terms, such as an action, bot, app, or the like. The skill component 590 and or skill support system(s) 525 may return output data to the CPU 130.

The whisper detection component 570 may process the audio data to determine whether a speaker is speaking in a whisper; e.g., rather than in a normal voice. The whisper detection component 570 may compare features of the audio data to stored features corresponding to whispered speech. The comparisons may be performed using a neural task. For example, the whisper detection component 570 may request execution of a neural task that includes processing the audio data with a model trained to recognize features associated with whispered speech; for example, a CNN. If the whisper detection component 570 determines that the user is whispering, the device 110 and/or the system 520 may process the speech in a whisper mode and/or provide responses in a whisper mode. Whisper mode speech processing may include using different acoustic and/or language models suited to the different audio characteristics of whispered speech versus normal speech. Whisper mode speech generation may include generating synthetic speech having a lower overall volume and/or a different timbre quality that, for example, may be less likely to disturb other people in the vicinity of the device 110 such as a sleeping infant.

The speaker identification component 580 may process the audio data to determine an identity of the speaker. The speaker identification component 580 may compare features of the audio data to stored features corresponding to various user profiles to identify one or more possible speakers. The comparisons may be performed using a neural task. For example, the speaker identification component 580 may request execution of a neural task that includes processing the audio data with a model trained to recognize features associated with one or more speaker identifiers; for example, a CNN. In some implementations, an output of the speaker identification component 580 may include a 1-best or n-best list of possible speaker identifiers, and in some case may include one or more confidence scores associated with the one or more possible speaker identifiers. The output of the speaker identification component 580 may be used on the device 110 and/or sent to the system 520 to aid in user recognition and/or to identify user profile-specific models and/or libraries for processing speech associated with that speaker identifier.

Figure 6:
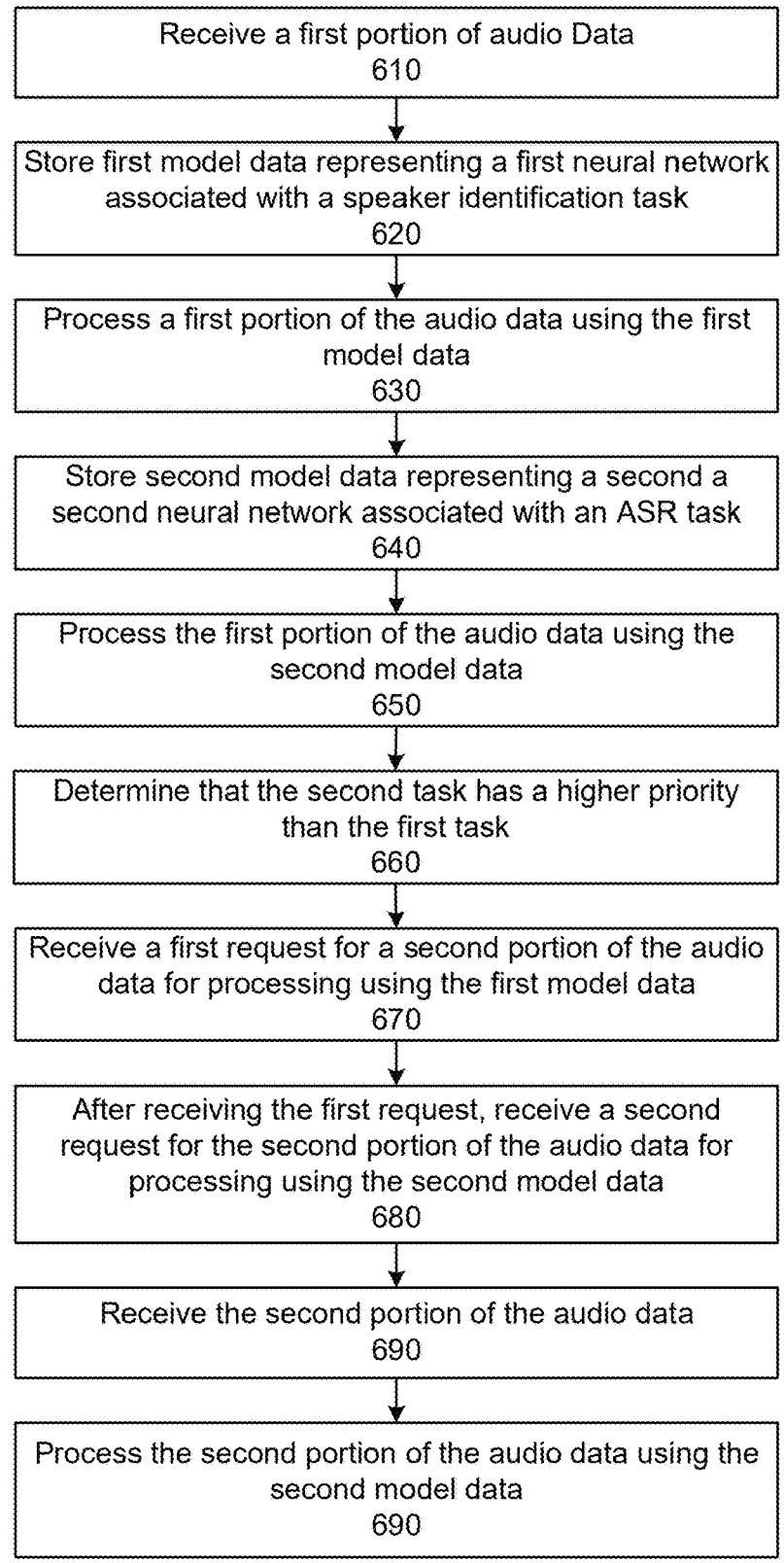
FIG. 6 is a flowchart illustrating example operations of a method of scheduling neural inference tasks in a speech processing system, according to embodiments of the present disclosure.

FIG. 6 is a flowchart illustrating example operations of a method 600 of scheduling neural inference tasks in a speech processing system, according to embodiments of the present disclosure. The method 600 may be performed by components of the device 110, and possibly in conjunction with one or more additional devices and/or systems such as the second device or system 520 and/or the skill support system 525 described with reference to FIG. 5. The method 600 may include receiving (610) audio data corresponding to first audio detected by the device. The input data may include a plurality of sequential data portions (e.g., frames, or groups of consecutive frames, of audio data) including at least a first portion and a second portion, etc. The method 600 may include loading (620) (e.g., storing) first model data into a first memory (e.g., the first memory 160a) associated with a first processor (e.g., the first processor 150a). The first data may represent a first neural network associated with a first neural task. The first neural task may include determining a speaker identifier corresponding to speech detected in the audio data. The method 600 may include processing (630) the first portion of the audio data using the first processor 150a and the first model data. The method 600 may include loading (640) (e.g., storing) second model data into the first memory 160a. The second data may represent a second neural network associated with a second neural task. The second neural task may including performing ASR processing. The method 600 may include processing (650) the first portion of the input data using the first processor 150a and the second model data. The method 600 may include determining (660) that the second task has higher priority than the first task. For example, the model analysis component 142 and/or the scheduler 140 may determine that the second task may represent part of a critical path for perceived latency and/or may represent a resource-intensive task. In some implementations, the model analysis component 142 and/or the scheduler 140 may make additional determinations regarding priority and interweaving of operations corresponding to different tasks. FIGS. 7 through 10 illustrate examples of various scheduling strategies. The method 600 may include receiving (670) a first request for additional input data for processing using the first model data. The method 600 may include, after receiving the first request, receiving (680) a second request for additional input data for processing using the second model data. After receiving the requests, the method 600 may include receiving (690) the second portion of the input data. The method 600 may include, in response to determining that the second task has higher priority than the first task processing (695), the second portion using the first processor and the second data. In this manner, the scheduler 140 may reduce latency by prioritizing a later-received request over and earlier-received request.

Although the FIG. 6 illustrates certain stages/steps in a particular order, the steps described may be performed in a different order and/or during overlapping time periods (as well as certain steps removed or added) without departing from the present disclosure.

Figure 7:
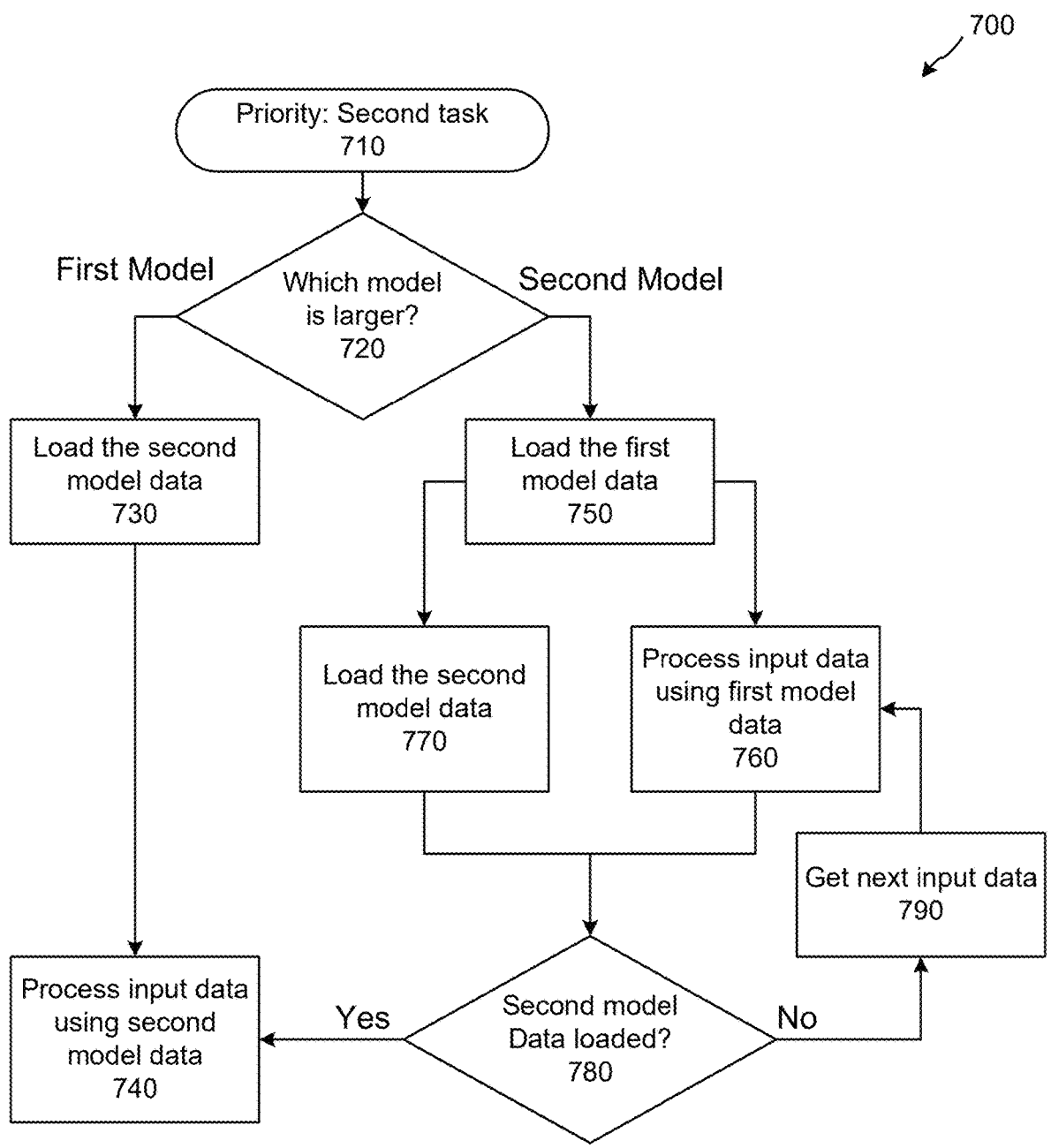
FIG. 7 is a flowchart illustrating first example neural task scheduling decisions, according to embodiments of the present disclosure.

FIG. 7 is a flowchart illustrating first example neural task scheduling decisions, according to embodiments of the present disclosure. A neural task pipeline may involve performing a first neural task and a second neural task on a sequence of input data chunks (e.g., portions). The model analysis component 142 may determine that a second neural task has a higher priority, but uses a much larger model than the first neural task (e.g., in terms of number of bytes, parameters, connections, layers, etc.). The scheduler 140 may thus load the first model associated with the first task into the memory 160 (which it can do relatively quickly) and begin processing the input data. While the processor 150 is performing the first task, the scheduler 140 can load the second model into the memory 160. When the second model is fully loaded, the scheduler 140 can terminate the processing associated with the first model, and begin processing the input data using the second model.

In example operations 700 shown in FIG. 7, the scheduler 140 may organize two tasks, where the second task has a higher priority than the first task (710). The operations 700 include determining, at a decision block 720, which task uses larger model data. If first model data associated with the first task is larger than second model data associated with the second task ("First Model" at the decision block 720), the operations 700 may include loading (730) the second model data into a memory and processing (740) input data using the second model data. The scheduler 140 may determine in this case that there is no operational benefit to be gained by beginning the lower-priority task first.

If, however, the scheduler 140 determines that the second model data is larger ("Second Model" at the decision block 720), the scheduler 140 may determine that resource utilization can be increased if it loads the smaller, lower-priority first model data into memory, and begins processing data substantially in parallel with loading the higher-priority but larger second model data into the memory (e.g., into a separate memory space from the first model data). Accordingly, the operations 700 may include loading (750) the first model data into the memory. The operations 700 may then include processing (760) the input data using the first model data substantially in parallel with loading (770) the second model data into memory. The operations 700 may include determining (at a decision block 780) whether the second model data has completed loading. If the second model data is finished loading ("Yes" at the decision block 780), the operations 700 may include advancing to the stage 740 and processing the input data using the second model data. If the second model data is not finished loading ("No" at the decision block 780), the operations 700 may include getting (790) next input data, and processing (760) it using the first model data before returning to the decision block 780. The operations 700 may include continuing to get next input data and process it until the second model data completes loading.

Figure 8:
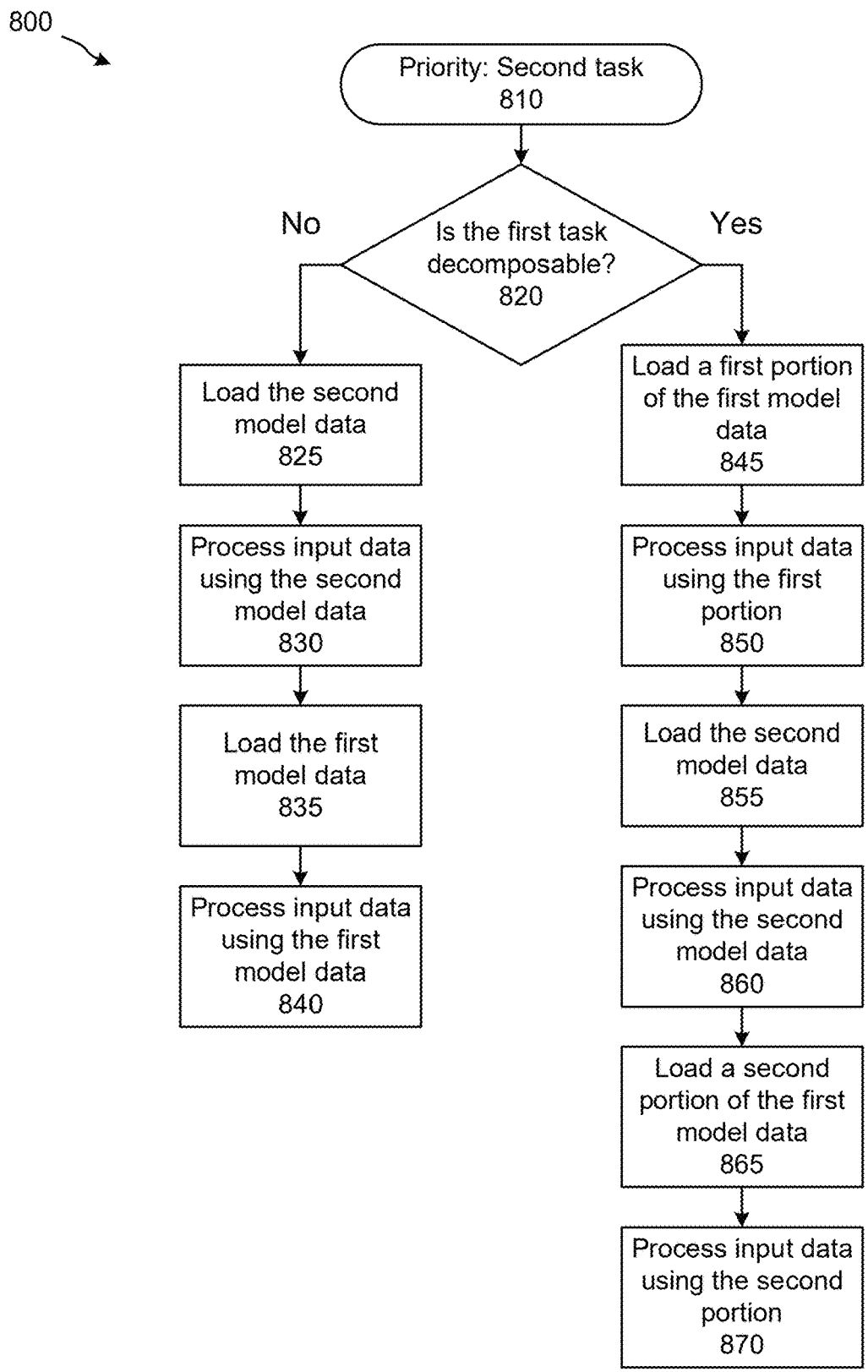
FIG. 8 is a flowchart illustrating second example neural task scheduling decisions, according to embodiments of the present disclosure.

FIG. 8 is a flowchart illustrating second example neural task scheduling decisions, according to embodiments of the present disclosure. In this example of a pipeline involving first and second neural tasks, the model analysis component 142 may determine that the second neural task has a higher priority than the first neural task, and that the a sum of the size of the first model and the second model exceeds a capacity of the memory 160. The model analysis component 142 may determine, however, that the first model may be decomposed. Thus, the model analysis component 142 may determine that the memory 160 may have capacity for the second model and a portion of the first model. In order to maximize resource utilization and without increasing latency with regard to the second neural task, the scheduler 140 may cause only a first portion of a first model associated with the first task to be loaded into memory. The scheduler 140 may cause the processor 150 to process some input data using the first portion of the model. During the processing, the scheduler 140 may cause the memory 160 to load the second model. Once the second model is loaded into the memory 160, the scheduler 140 may cause the processor 150 to process the input data using the second model. During the processing, the scheduler 140 may cause the processor to load the second portion of the first model. When the processor 150 completes the processing using the second model, the scheduler 140 may cause the processor 150 to begin processing the input data using the second portion of the first model.

In example operations 800 shown in FIG. 8, the scheduler 140 may organize two tasks, where the second task has a higher priority than the first task (810). The operations 800 include determining, at a decision block 820, whether first model data associated with the first task is decomposable (e.g., can the model be broken down into portions and used to process data independently). If the first model data is not decomposable ("No" at the decision block 820), the operations 800 may include loading (825) the second model data into a memory, processing (830) input data using the second model data, loading (835) the first model data into the memory, and processing (840) the input data using the first model data. The scheduler 140 may determine in this case that it is not possible to begin executing the lower-priority task first (e.g., due to a memory capacity constraint).

If, however, the first model data is decomposable ("Yes" at the decision block 820), the operations 800 may include loading (845) a first portion of the first model data and processing (850) the input data using the first portion of the first model data. The operations 800 may further include loading (855) the second model data into the memory and processing (860) the input data using the second model data. The operations 800 may further include loading (865) a second portion of the first model data into the memory, and processing (870) the input data using the second portion. In this manner, the scheduler 140 is able to realize a resource utilization benefit by exploiting the decomposable nature of the first model data to load a portion into a free memory space and use it to process some of the input data while the relatively larger second model data is loading into the memory.

Figure 9:
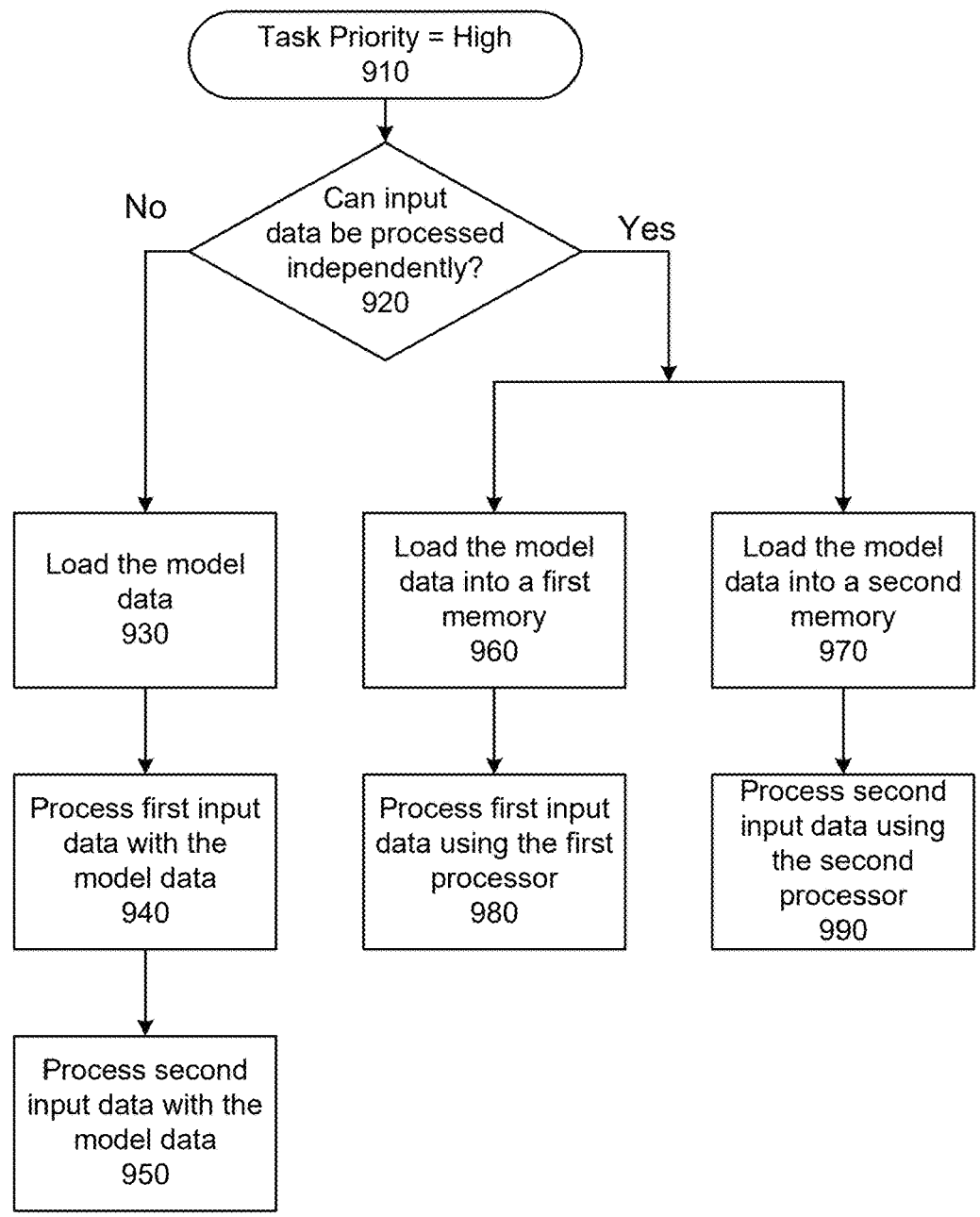
FIG. 9 is a flowchart illustrating third example neural task scheduling decisions, according to embodiments of the present disclosure.

FIG. 9 is a flowchart illustrating third example neural task scheduling decisions, according to embodiments of the present disclosure. In this example, the model analysis component 142 may determine that a high-priority neural task (e.g., a task on a critical path with regard to latency), may process input data independently; that is, processing a second portion of the input data does not depend on a result of processing the first portion. Thus, in a device 110 with multiple processors 150*a* and 150*b*, the model can process a batch of input data in parallel. The scheduler 140, based on the priority of the task and on the data independence of the model, may load the model into both a first memory 160*a* associated with the first processor 150*a* and a second memory 160*b* associated with the second processor 150*b*. The scheduler 140 may then cause the processors 150 to execute the input data at least partially in parallel. In some implementations, the processor 150*a* and 150*b* may process the input data using model data stored in a single, shared memory. In either case, processing the input in parallel may reduce latency, but possibly at the expense of a memory penalty (e.g., loading the same model twice into two different memories, or reading the model from a single memory with two processors).

In example operations 900 shown in FIG. 9, the scheduler 140 may recognize that a task is associated with a high priority (e.g., because it represents a critical path with regard to latency) (910). The operations 900 include determining, at a decision block 920, whether the model data can process inputs independently (e.g., where processing a portion of the input data does not depend on a result of processing a previous portion of the input data). If the input data cannot be processing independently using the model data ("No" at the decision block 920), the operations 900 may include loading (930) the model data into a memory, processing (940) first input data using the model data, and processing (950) second input data using the model data. The scheduler 140 may determine in this case that it is not possible to accelerate this particular task (e.g., because of interdependencies in processing the data).

If, however, the input data can be processing independently using the model data ("Yes" at the decision block 920), the operations 900 may include loading (960) the model data into a first memory and loading (970) the model data into a second memory, where the stages 960 and 970 may execute at least partially in parallel. The operations 900 may further include processing (980) the first input data using a first processor associated with the first memory, and processing (990) the second input data using a second processor associated with the second memory, where the stages 980 and 990 may execute at least partially in parallel. The scheduler 140 may thus realize a reduction in latency by performing parallel batch processing of input data.

Figure 10:
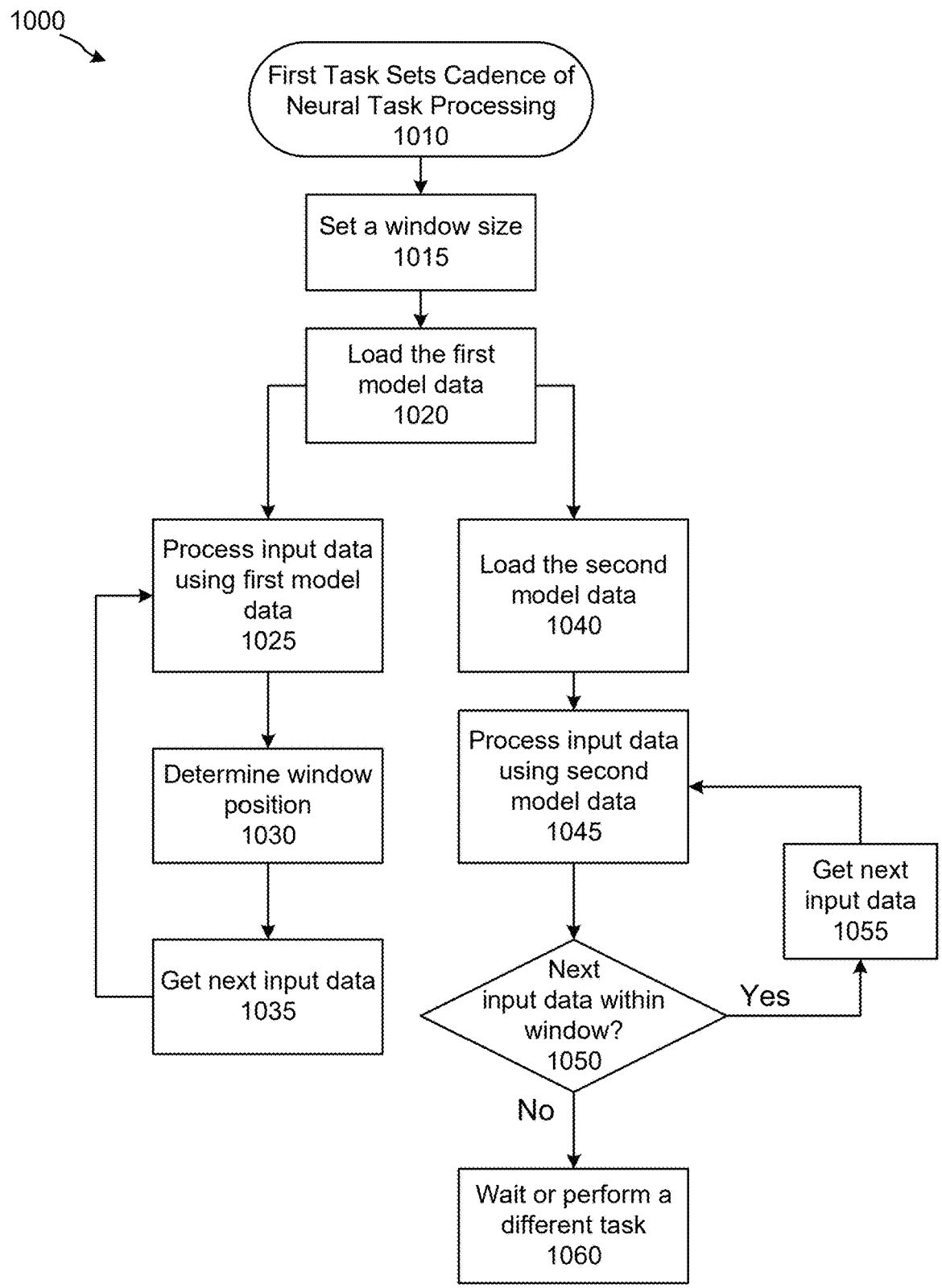
FIG. 10 is a flowchart illustrating fourth example neural task scheduling decisions, according to embodiments of the present disclosure.

FIG. 10 is a flowchart illustrating fourth example neural task scheduling decisions, according to embodiments of the present disclosure. In this example, the model analysis component 142 may determine that a first neural task has a high-priority (e.g., a task on a critical path with regard to latency). The scheduler 140 may thus use the timing of processing of the first task to set a cadence for other tasks. The other tasks may, for example, use smaller models that load faster and/or require less compute and thus process faster. Processing tasks according to, for example, timestamps indicating a time received may result in queuing various tasks without regard for time sensitivity of the task (e.g., which tasks have a greater effect on perceived latency). Processing tasks according to priority, however, may allow a higher-priority task processing data in a data stream to advance ahead of other tasks which, although lower in priority, may still be important. For example, one high priority task may have the ability to process large amounts of data while a lower priority task may process smaller portions of data (e.g., a first speech processing task may process a second or more of audio data while a second speech processing task may only process 30 ms at a time). Thus, in some implementations, the scheduler 140 may set a cadence for processing based on a particular task. The cadence approach may allow the scheduler 140 to organize tasks according to both priority and timestamp. For example, the scheduler 140 may set a timestamp window, keyed to the processing of the first task. Each time the task processes a chunk of data, the window may be set according to, for example, a timestamp of the last data processed by the first task. The scheduler 140 may only allow other tasks to process data having timestamps within the window. The window size (e.g., representing a range of timestamps), may be set according to a time it takes the first task to process a chunk of data. For example, if the first task can process a chunk of data in 10 ms, the scheduler may set the window to 10 ms (allowing other tasks to process tasks at a same overall rate as the first task, but no faster), 20 ms (allowing other tasks to process the tasks at twice the rate of the first task, but no faster), etc. FIG. 10 illustrates such operations 1000.

In example operations 1000 shown in FIG. 10, the scheduler 140 may recognize that a first neural task is associated with a high priority (e.g., because it represents a critical path with regard to latency) and thus set a cadence for other neural tasks (1010). The operations 1000 include setting (1015) a window size. The scheduler 140 may set the window size relative to a time (or estimated time) it may take to process a first chunk of data using the first neural task. For example, the scheduler 140 may set a window size that may equal or approximate the time it takes to process a chunk of data using the first neural task, twice that time, thrice that time, etc. Thus, the scheduler 140 may allow other neural tasks to process data chunks in advance of the first neural task to increase utilization of compute and/or memory bandwidth, but without monopolizing those resources or advancing too far ahead of the first neural task. A position of the window in time may be set according to, for example, a timestamp of the last data processed using the first neural task or next data queued for processing using the first neural task, or some other time representing progress of the first neural task in processing a stream of input data.

The operations 1000 may include loading 1025 first model data used for performing the first neural task (e.g., the task used for setting the cadence) into memory. The operations 1000 may include processing 1025 a first portion of input data using the first model data. The operations 1000 may include determining 1030 a new position for the window; for example, according to a timestamp of the last input data processed using the first model data, a timestamp of the next input data queued for processing using the first model data, or some other reference time corresponding to the progress of the first neural task with respect to processing a stream of the input data. The operations 1000 may include getting a next portion of the input data for processing using the first model data.

At least partially in parallel and/or interweaved with the operations 1025 through 1035, the operations 1000 may include loading 1040 second model data used for a second neural task into the memory. The second model data may be used for a second neural task that may be lower priority than the first neural task but that may use less compute and/or less memory bandwidth and thus may process the input data at a faster rate than the first neural task. The operations 1000 may include processing 1045 a portion of the input data using the second model data. The portion(s) of the input data processed using the second model data may not correspond directly to the portion(s) of the input data processed using the first model data. For example, the first neural task may process 10 MB portions at a time while the second neural tasks may process 1 MB portions. The operations may include determining, at a decision block 1050, whether a next portion of the input data is within the window set during the last iteration of the operation 1030. If so ("Yes" at the decision block 1050), the operations 1000 may include getting 1055 a next portion of the input data and processing 1045 it using the second model data. If the next portion of the input data is not within the window ("No" at the decision block 1050), the operations 1000 may include waiting (1060) before getting the next portion of the input data for processing using the second model data and/or performing a different neural task (e.g., by loading third model data into the memory and using it to perform a third neural task on a portion(s) of data within the window). In this manner, the scheduler 140 may increase utilization of compute and memory bandwidth resources by running multiple neural tasks having different priorities partially in parallel, but without allowing lower priority tasks to process data too far in ahead of the high priority task.

Figure 11:
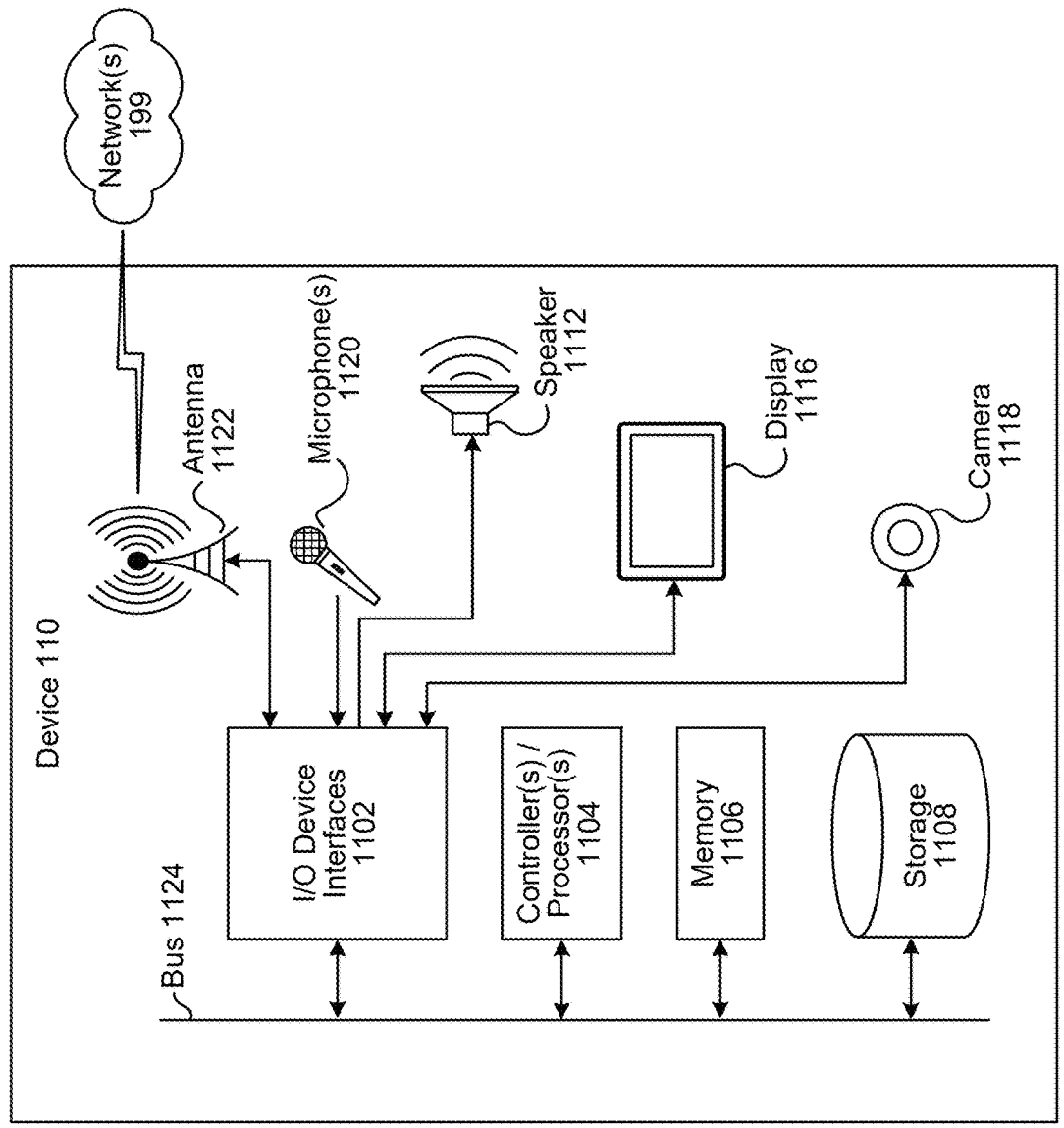
FIG. 11 is a block diagram conceptually illustrating example components of a device, according to embodiments of the present disclosure.
Figure 12:
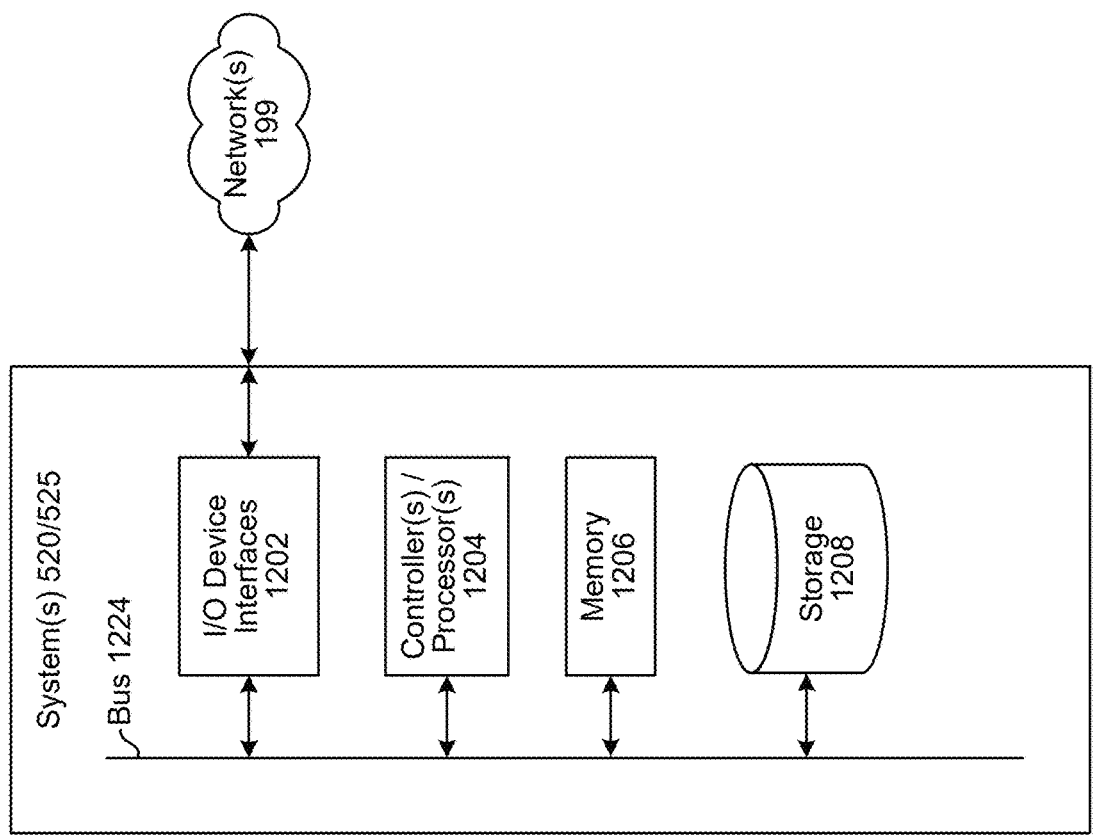
FIG. 12 is a block diagram conceptually illustrating example components of a system, according to embodiments of the present disclosure.

FIG. 11 is a block diagram conceptually illustrating a device 110 that may be used with the system. FIG. 12 is a block diagram conceptually illustrating example components of a remote device, such as the natural language command processing system 520, which may assist with ASR processing, NLU processing, etc., and a skill support system 525. A system (520/525) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (520/525) may be included in the overall system 100 of the present disclosure, such as one or more natural language processing systems 520 for performing ASR processing, one or more natural language processing systems 520 for performing NLU processing, one or more skill systems 525, etc. In operation, each of these systems may include computer-readable and computer-executable instructions that reside on the respective device (520/525), as will be discussed further below.

Each of these devices (110/520/525) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/520/525) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/520/525) may also be connected to removable or external non-volatile memory and/or storage (such as a removable memory card, memory key drive, networked storage, etc.) through respective input/output device interfaces (1102/1202).

Computer instructions for operating each device (110/520/525) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/520/525) includes input/output device interfaces (1102/1202). A variety of components may be connected through the input/output device interfaces (1102/1202), as will be discussed further below. Additionally, each device (110/520/525) may include an address/data bus (1124/1224) for conveying data among components of the respective device. Each component within a device (110/520/525) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1122, the input/output device interfaces 1102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device(s) 110, the natural language command processing system 520, or a skill support system 525 may include their own dedicated processors, memory, and/or storage. Alternatively, one or more of the components of the device(s) 110, the natural language command processing system 520, or a skill support system 525 may utilize the I/O interfaces (1102/1202), processor(s) (1104/1204), memory (1106/1206), and/or storage (1108/1208) of the device(s) 110, natural language command processing system 520, or the skill support system 525, respectively. Thus, the ASR component 135/350/450 may have its own I/O interface(s), processor(s), memory, and/or storage; the NLU component 560 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 520, and a skill support system 525, as described herein, are illustrative, and may be located as a stand-alone device or may be included, in whole or in part, as a component of a larger device or system.

Figure 13:
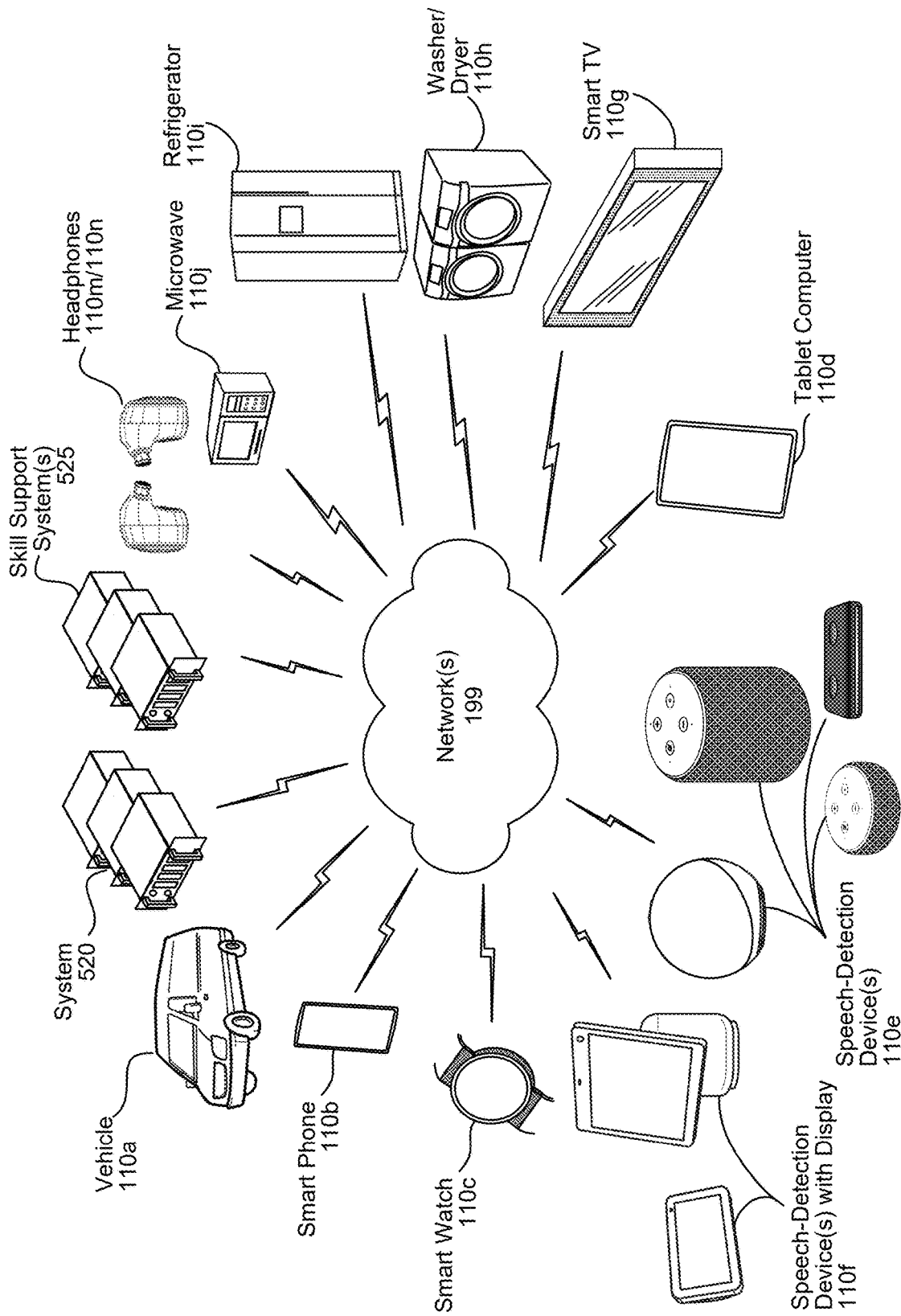
FIG. 13 illustrates an example of a computer network for use with the overall system, according to embodiments of the present disclosure.

As illustrated in FIG. 13, multiple devices (110a-110n, 520, 525) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 520, the skill system(s) 525, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 135/350/450, the NLU component 560, etc. of the natural language command processing system 520.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving a first portion of audio data corresponding to first audio detected by a device;
identifying a first neural network configured to determine a user profile from a sound of speech represented in the audio data and a second neural network configured to perform automatic speech recognition (ASR) processing of the speech, wherein the second neural network corresponds to a larger memory footprint than the first neural network;
in response to the second neural network corresponding to a larger memory footprint than the first neural network, processing the first portion using first model data corresponding to the first neural network;
after processing the first portion using the first model data, processing the first portion using second model data corresponding to the second neural network to generate a first output;
determining that the second neural network is associated with a higher priority than the first neural network;
receiving a first request for a second portion of the audio data for processing using the first neural network;
after receiving the first request, receiving a second request for the second portion for processing using the second neural network;
receiving the second portion of the audio data; and in response to determining that the second neural network is associated with a higher priority than the first neural network, processing the second portion using the second neural network to generate a second output before processing the second portion using the first neural network.

2. The computer-implemented method of claim 1, wherein the audio data includes a plurality of sequential frames of audio data, the method further comprising:
loading at least a portion of the first model data into a first memory before loading the second model data;
processing a plurality of frames using the portion of the first model data;
loading the second model data into the first memory at least partially in parallel with processing the plurality of frames using the first model data;
determining that the second model data is loaded into the first memory;
in response to determining that the second model data is loaded into the first memory, terminating processing associated with the first model data; and
processing at least a first frame using the second model data.

3. The computer-implemented method of claim 1, further comprising:
determining to analyze the audio data for a representation of a wakeword;
identifying third model data representing a third neural network configured to perform wakeword detection;
determining that the third model data includes a first portion and a second portion, wherein the first portion of the third model data and the second portion of the third model data, respectively, are capable of independently processing different portions of the audio data;
processing the audio data using the first portion of the third model data; and
prioritizing at least one processing operation corresponding to the second model data over processing the audio data using the second portion of the third model data.

4. The computer-implemented method of claim 1, wherein the second model data includes an ASR encoder and third model data representing a third neural network component including an ASR decoder, the method further comprising:
determining that the third model data is associated with a high priority;
determining that the third neural network component is capable of processing multiple inputs independently;
loading, into a first memory associated with a first processor, the third model data;
loading, into a second memory associated with a second processor, the third model data;
processing the first output using the first processor and the third model data; and
processing the second output using the second processor and the third model data at least partially in parallel with processing the first output.

5. A computer-implemented method comprising:
receiving a first portion of input data;
identifying a first neural network component configured to perform a first task using the input data and a second neural network component configured to perform a second task using the input data, wherein the second neural network component corresponds to a larger memory footprint than the first neural network component;

in response to the second neural network component corresponding to a larger memory footprint than the first neural network component, processing the first portion using first data corresponding to the first neural network component;
after processing the first portion using the first data, processing the first portion using second data corresponding to the second neural network component;
determining that the second data is associated with a higher priority than the first neural network component;
receiving a first request for additional input data for processing using the first neural network component;
after receiving the first request, receiving a second request for additional input data for processing using the second neural network component;
receiving a second portion of the input data; and
in response to determining that the second neural network component is associated with a higher priority than the first neural network component, processing the second portion using the second neural network component before processing the second portion using the first neural network component.

6. The computer-implemented method of claim 5, further comprising:
storing the second data in a first memory at least partially in parallel to processing the first portion using the first data;
determining that the second data is stored in the first memory;
in response to determining that the second data is stored in the first memory, terminating processing associated with the first data; and
processing at least a portion of the input data using the second data.

7. The computer-implemented method of claim 5, further comprising:
determining a third task to perform using the input data;
identifying third data representing a third neural network component configured to perform the third task;
determining that the third neural network component includes a first portion and a second portion, wherein the first portion of the third neural network component and the second portion of the third neural network component, respectively, are capable of independently processing different portions of the input data;
processing the input data using the first portion of the third neural network component; and
prioritizing at least one processing operation corresponding to the second data over processing the input data using the second portion of the third neural network component.

8. The computer-implemented method of claim 5, further comprising:
determining a third task to perform using the input data, wherein the third task is associated with third data representing a third neural network component configured to perform the third task;
determining that the third data is associated with a high priority;
determining that the third neural network component is capable of processing multiple inputs independently;
storing, in a first memory, the third data;
storing, in a second memory associated with a second processor, the third data;
processing fourth data using the third data, wherein the fourth data represents input data or an output of a processing operation; and processing fifth data using the second processor and the third data at least partially in parallel with processing the fourth data, wherein the fifth data represents input data or an output of a processing operation and is different from the fourth data.

9. The computer-implemented method of claim 8, wherein:
the third task includes processing outputs of the second task,
processing the first portion using the second data generates the fourth data, and
processing the second portion using the second data.

10. The computer-implemented method of claim 5, wherein the input data includes a plurality of sequential portions, the method further comprising:
determining that the second task is associated with a high priority;
in response to determining that the second task is associated with a high priority, processing the first portion of the input data using the second data without waiting to receive the second portion of the input data;
determining that the first task is not associated with a high priority;
in response to determining that the first task is not associated with a high priority, buffering at least two portions of input data; and
processing the at least two portions of input data in a batch operation using the first data.

11. The computer-implemented method of claim 5, further comprising:
identifying a plurality of tasks to be performed on the input data, the plurality of tasks including at least the first task and the second task;
determining that the second task potentially has an effect on latency with regard to processing the input data; and
in response to determining that the second task potentially has an effect on latency, scheduling the plurality of tasks, respectively, to prioritize operations associated with the second task.

12. The computer-implemented method of claim 5, wherein:
the first task and the second task include speech processing operations,
the first data represents a convolutional neural network, and
the second data represents a recurrent neural network.

13. A system, comprising:
at least one processor; and
at least one memory comprising instructions that, when executed by the at least one processor, cause the system to:
receive a first portion of input data;
identify a first neural network component configured to perform a first task using the input data and a second neural network component configured to perform a second task using the input data, wherein the second neural network component corresponds to a larger memory footprint than the first neural network component;
in response to the second neural network component corresponding to a larger memory footprint than the first neural network component, process the first portion using first data corresponding to the first neural network component;
after processing the first portion using the first data, process the first portion using second data corresponding to the second neural network component;
determine that the second neural network component is associated with a higher priority than the first neural network component;
receive a first request for additional input data for processing using the first neural network component;
after receiving the first request, receive a second request for additional input data for processing using the second neural network component;
receive a second portion of the input data; and
in response to determining that the second neural network component is associated with a higher priority than the first neural network component, process the second portion using the second neural network component before processing the second portion using the first data.

14. The system of claim 13, wherein the at least one memory further comprises instructions that, when executed by the at least one processor, further cause the system to:
store the second data in a first memory at least partially in parallel to processing the first portion using the first data;
determine that the second data is stored in the first memory;
in response to determining that the second data is stored in the first memory, terminate processing associated with the first data; and
process at least a portion of the input data using the second data.

15. The system of claim 13, wherein the at least one memory further comprises instructions that, when executed by the at least one processor, further cause the system to:
determine a third task to perform using the input data;
identify third data representing a third neural network component configured to perform the third task;
determine that the third neural network component includes a first portion and a second portion, wherein the first portion of the third neural network component and the second portion of the third neural network component, respectively, are capable of independently processing different portions of the input data;
process the input data using the first portion of the third neural network component; and
prioritize at least one processing operation corresponding to the second data over processing the input data using the second portion of the third neural network component.

16. The system of claim 13, wherein the at least one memory further comprises instructions that, when executed by the at least one processor, further cause the system to:
determine a third task to perform using the input data, wherein the third task is associated with third data representing a third neural network component configured to perform the third task;
determine that the third task is associated with a high priority;
determine that the third neural network component can process multiple inputs independently;
store, in a first memory, the third data;
store, in a second memory associated with a second processor, the third data;
process fourth data using the third data, wherein the fourth data represents input data or an output of a processing operation; and
process fifth data using the second processor and the third data at least partially in parallel with processing the fourth data, wherein the fifth data represents input data or an output of a processing operation and is different from the fourth data.

17. The system of claim 16, wherein:
the third task includes processing outputs of the second task,
processing the first portion using the second data generates the fourth data, and
processing the second portion using the second data.

18. The system of claim 13, wherein the input data includes a plurality of sequential portions, and the at least one memory further comprises instructions that, when executed by the at least one processor, further cause the system to:
determine that the second task is associated with a high priority;
in response to determining that the second task is associated with a high priority, process the first portion of the input data using the second data without waiting to receive the second portion of the input data;
determine that the first task is not associated with a high priority;
in response to determining that the first task is not associated with a high priority, buffer at least two portions of input data; and
process the at least two portions of input data in a batch operation using the first data.

19. The system of claim 13, wherein the at least one memory further comprises instructions that, when executed by the at least one processor, further cause the system to:
identify a plurality of tasks to be performed on the input data, the plurality of tasks including at least the first task and the second task;
determine that the second task potentially has an effect on latency with regard to processing the input data; and
in response to determining that the second task potentially has an effect on latency, schedule the plurality of tasks, respectively, to prioritize operations associated with the second task.

20. The system of claim 13, wherein:
the first task and the second task include speech processing operations,
the first data represents a convolutional neural network, and
the second data represents a recurrent neural network.

* * * * *